US008700987B2

(12) United States Patent
Spalink

(10) Patent No.: US 8,700,987 B2
(45) Date of Patent: Apr. 15, 2014

(54) ANNOTATING E-BOOKS / E-MAGAZINES WITH APPLICATION RESULTS AND FUNCTION CALLS

(75) Inventor: Karin Johanne Spalink, Durham, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 23 days.

(21) Appl. No.: 13/148,512

(22) PCT Filed: Sep. 9, 2010

(86) PCT No.: PCT/US2010/048195
§ 371 (c)(1),
(2), (4) Date: Aug. 9, 2011

(87) PCT Pub. No.: WO2012/033492
PCT Pub. Date: Mar. 15, 2012

(65) Prior Publication Data
US 2012/0066581 A1    Mar. 15, 2012

(51) Int. Cl.
*G06F 17/00*    (2006.01)

(52) U.S. Cl.
USPC ............ 715/232; 715/230; 715/231; 715/233

(58) Field of Classification Search
USPC .................................. 715/232, 230, 231, 233
See application file for complete search history.

(56) References Cited

U.S. PATENT DOCUMENTS

| | | | |
|---|---|---|---|
| 7,418,656 B1 * | 8/2008 | Petersen ........................ | 715/230 |
| 8,295,037 B1 * | 10/2012 | Buuck et al. ............. | 361/679.01 |
| 2004/0268253 A1 | 12/2004 | DeMello et al. | |
| 2007/0120762 A1 * | 5/2007 | O'Gorman ...................... | 345/1.1 |
| 2007/0271503 A1 * | 11/2007 | Harmon et al. ................ | 715/512 |
| 2009/0172531 A1 * | 7/2009 | Chen et al. ..................... | 715/702 |
| 2010/0325143 A1 * | 12/2010 | Straub et al. .................. | 707/769 |

FOREIGN PATENT DOCUMENTS

WO    2005/043309 A2    5/2005

OTHER PUBLICATIONS

International Search Report and Written Opinion dated Jun. 17, 2011 issued in corresponding PCT application No. PCT/US2010/048195, 11 pages.

Price, M.N., et al.; "Linking by Inking: Trailblazing a Paper-Like Hypertext"; Hypertext '98; The 9$^{th}$ ACM Conference on Hypertext and Hypermedia; Pittsburgh, PA, USA; [ACM Conference on Hypertext and Hypermedia], New York, NY; Jun. 20, 1998, pp. 30-39.

International Preliminary Report on Patentability dated Mar. 12, 2013 issued in corresponding PCT application No. PCT/US2010/048195, 6 pages.

* cited by examiner

*Primary Examiner* — Doug Hutton, Jr.
*Assistant Examiner* — Andrew McIntosh
(74) *Attorney, Agent, or Firm* — Snyder, Clark, Lesch & Chung, LLP

(57) ABSTRACT

A device receives and displays an electronic book or electronic magazine, and receives user selection of a portion of content of the electronic book or electronic magazine. The device executes an application that obtains items of data related to the selected portion of content, receives selection of one or more items of the data, and attaches the one or more items of data to the selected portion of the content in a bookmark fashion to annotate the e-book or e-magazine.

24 Claims, 20 Drawing Sheets

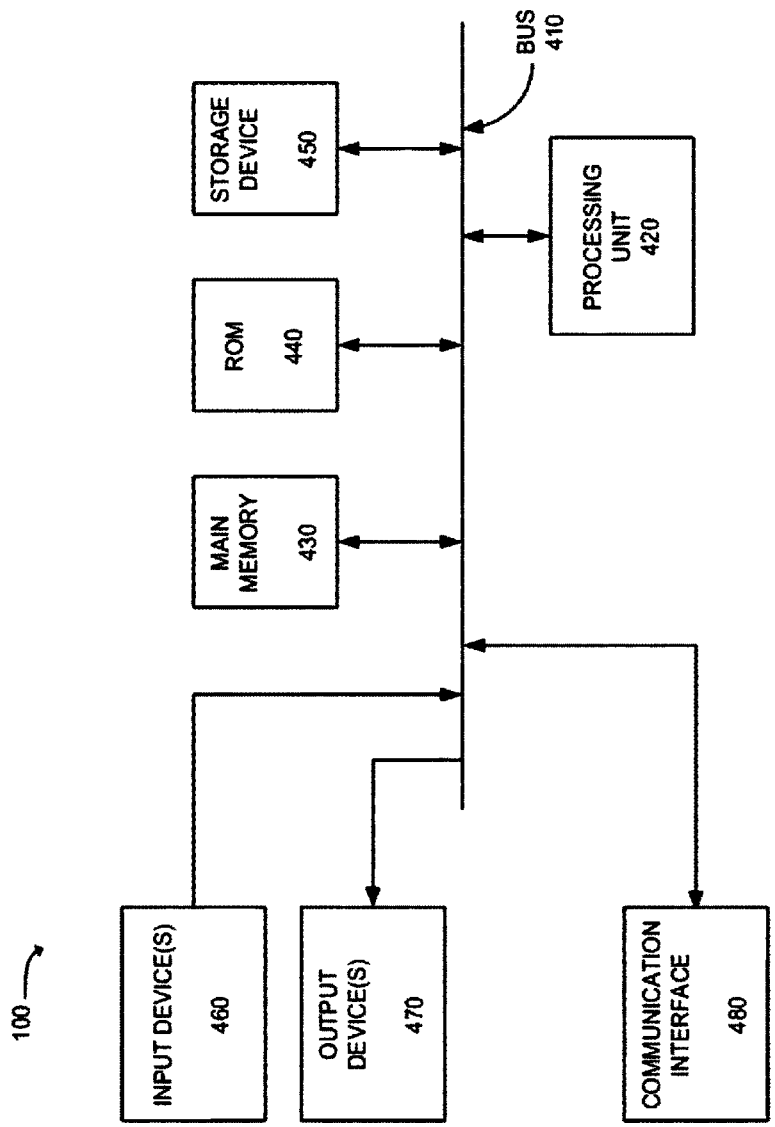

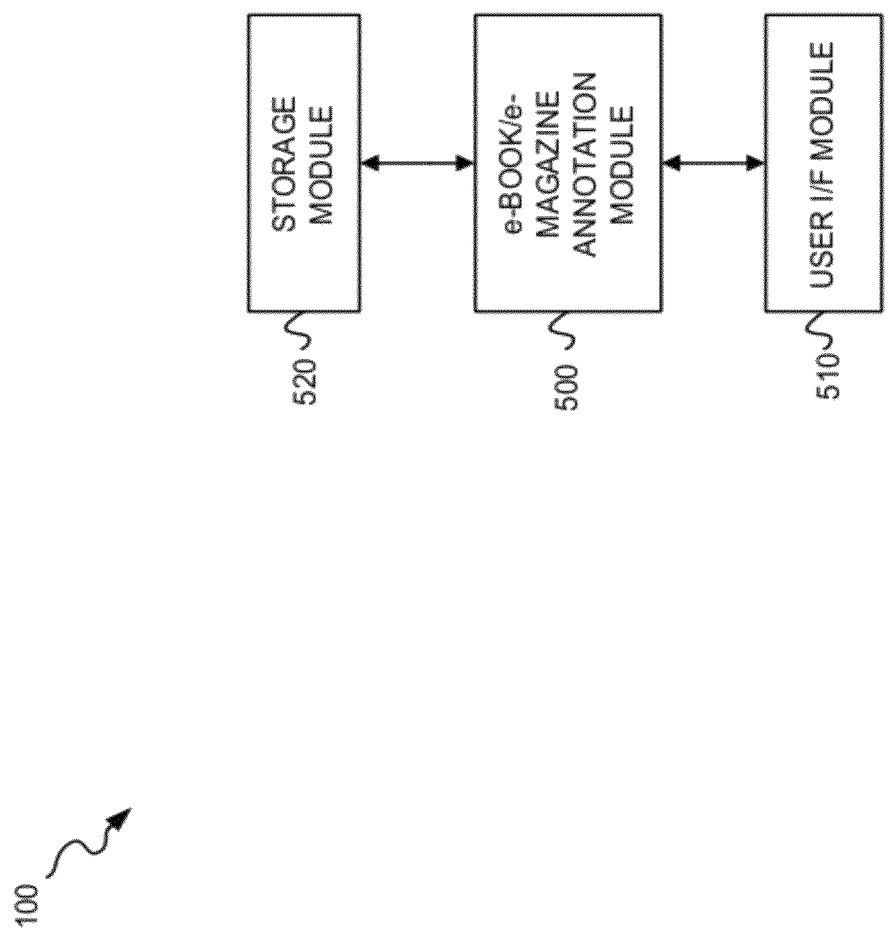

ANNOTATING E-BOOKS / E-MAGAZINES WITH APPLICATION RESULTS AND FUNCTION CALLS

BACKGROUND

Electronic books (e-books) or electronic magazines (e-magazines) include electronic text (and possibly associated graphics and images) that form a digital media replacement of conventional printed books or magazines. e-books or e-magazines may be read on a computer (e.g., personal, tablet or palmtop computer), or on a dedicated hand-held device that is purposely designed to serve as an e-book or e-magazine reader. Such dedicated devices are typically called e-readers or e-book devices. e-readers or e-book devices typically are designed with the appropriate screen size, battery lifespan, lighting and weight for the purpose of permitting users to easily and comfortably read e-books and/or e-magazines.

SUMMARY

In one exemplary embodiment, a method implemented by a processing unit of a device may include receiving and displaying an electronic book (e-book) or electronic magazine (e-magazine); receiving user selection of a portion of content of the e-book or e-magazine; executing an application that obtains items of data related to the selected portion of content; receiving selection of one or more items of the data; and attaching the one or more items of data to the selected portion of the content in a bookmark fashion to annotate the e-book or e-magazine.

Additionally, displaying the e-book or e-magazine may include displaying the e-book or e-magazine on a first display of the device having a first touch panel.

Additionally, wherein the device has network connectivity and wherein the device may include one of: a cellular radiotelephone, a desktop computer, a laptop computer, a palmtop computer, a tablet computer, a personal digital assistant (PDA), an e-reader or an e-book device.

Additionally, executing the application may include executing at least one of a web searching application, a mapping application, a navigation application, a translation application, a dictionary application, or a user comment entry application.

Additionally, the application may include the mapping application and the items of data may include data, associated with a map, which is related to the selected portion of content.

Additionally, the application may include the navigation application and the items of data may include data, associated with geographic navigation, which is related to the selected portion of content.

Additionally, the application may include the translation application and the items of data may include data associated with translating the selected portion of content from a first language to a second language.

Additionally, the application may include the dictionary application and the items of data may include dictionary definitions related to the selected portion of content.

Additionally, the application may include the user comment entry application and the items of data may include user provided comments related to the selected portion of content.

Additionally, the web searching application may include at least one of a text searching application, an image file searching application, a video file searching application, or an audio file searching application.

Additionally, the application may include the text searching application and the items of data may include text search results related to the selected portion of content; or wherein the application may include the image file searching application and the items of data may include one or more image files related to the selected portion of content; or wherein the application may include the video file searching application and the items of data may include one or more video files related to the selected portion of content; or wherein the application may include the audio file searching application and the items of data may include one or more audio files related to the selected portion of content.

Additionally, receiving user selection of a portion of content of the e-book or e-magazine further includes: receiving input from a user that visually highlights the portion of the content of the e-book or e-magazine on a first display that displays a page of the e-book or e-magazine.

Additionally, the method may further include presenting a menu of applications; and receiving user selection of the application from the menu of applications to execute the application.

Additionally, the menu of applications is presented by displaying the menu on a second display of the device having a second touch panel.

Additionally, the method may further include associating an icon with the one or more items of data; and displaying the icon in a vicinity of the portion of content when displaying a page of the e-book or magazine that includes the portion of the content.

Additionally, the method may further include storing the e-book or e-magazine along its annotations; and sending the e-book or e-magazine along with its annotations to a server for sharing with other users.

In another exemplary embodiment, a device may include a first display having a first touch panel; a second display having a second touch panel, wherein the second display is attached to the first display via a hinge mechanism such that the first and second displays can open and close in a book-like fashion; a communication interface configured to communicate via an external network; and a processing unit configured to: display an e-book or e-magazine via the first display, receive user selection of a portion of content of the e-book or e-magazine via the first touch panel, display a menu of applications via the second display, receive user selection of an application from the menu via the second touch panel, execute the user selected application to send the selected portion of the content and a function request to a server via the communication interface and the external network, receive items of data related to the selected portion of content from the server via the communication interface, receive selection of one or more of the items of data, and attach the selected one or more of the items of data to the selected portion of the content to annotate the e-book or e-magazine.

Additionally, when executing the user selected application, the processing unit is configured to: execute at least one of a web searching application, a mapping application, a navigation application, a translation application, a dictionary application, or a user comment entry application.

Additionally, when receiving user selection of the portion of content of the e-book or e-magazine via the first touch panel, the processing unit is further configured to: receive input from a user via the first touch panel that visually highlights the portion of the content of the e-book or e-magazine on the first display.

Additionally, the device may include one of: a cellular radiotelephone, a desktop computer, a laptop computer, a palmtop computer, a tablet computer, a personal digital assistant (PDA); an e-reader or an e-book device.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 4 is a diagram of exemplary components of the device of FIG. 1 or 2;

FIG. 5 is a diagram that depicts exemplary functional components of the device of FIG. 1 or 2;

DETAILED DESCRIPTION

The following detailed description refers to the accompanying drawings. The same reference numbers in different drawings may identify the same or similar elements. Also, the following detailed description does not limit the invention as claimed.

Overview

Figure 1:
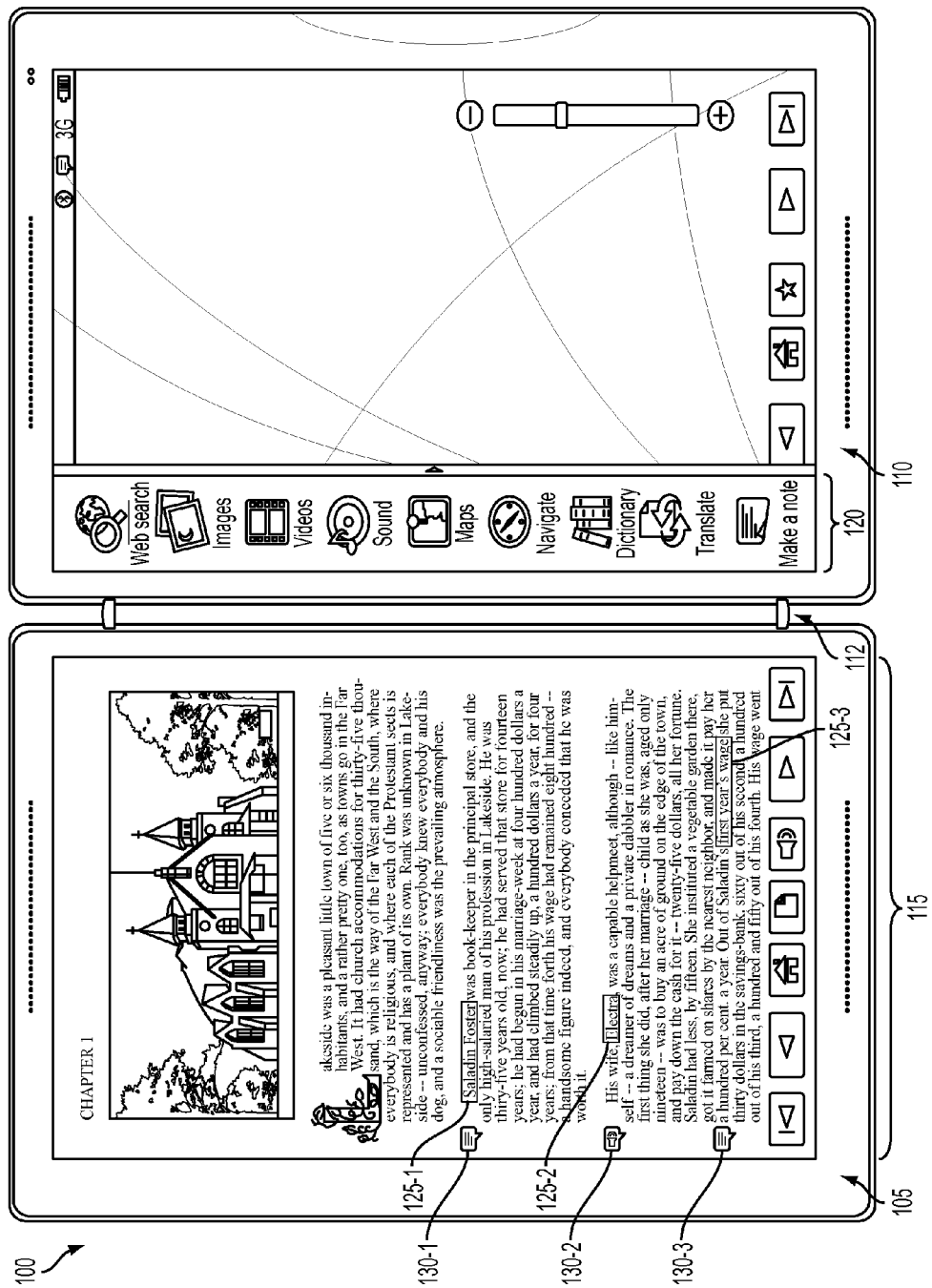
FIGS. 1 and 2 are diagrams that illustrate an overview of the annotation of an e-book or e-magazine.
Figure 2:
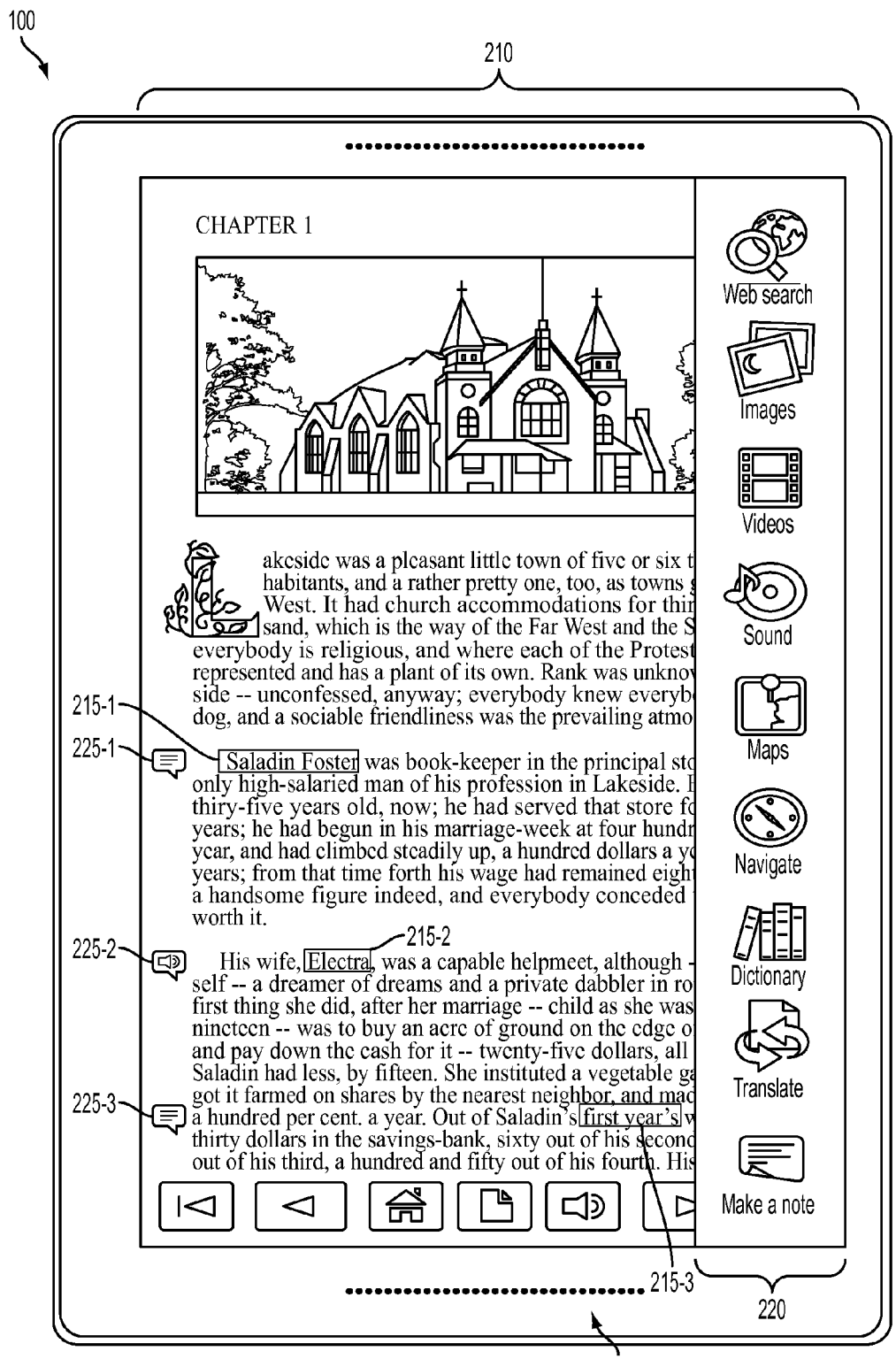

FIGS. 1 and 2 illustrate an overview of the annotation of an e-book or e-magazine using the results from one or more applications executed by a device 100 displaying the e-book or e-magazine. Device 100 may include any type of device that may display and annotate an e-book or e-magazine and which may include a communication interface that enables device 100 to interconnect with an external network. Device 100 may, for example, include a cellular radiotelephone; a desktop, laptop, palmtop or tablet computer; a personal digital assistant (PDA); or a dedicated e-reader or e-book device having a communication interface. As shown in FIG. 1, device 100 may display pages of an e-book or e-magazine using one or more display devices. The display devices may include a liquid crystal display (LCD), a cathode ray tube (CRT) display, an organic light-emitting diode (OLED) display, an e-ink display, a surface-conduction electro-emitter display (SED), a plasma display, a field emission display (FED), a bistable display, etc. Each of the display devices may further include a touch panel that is integrated with, and/or overlaid on, the display to form a touch screen that may function as a user input interface. For example, each of the display devices may include a near field-sensitive (e.g., capacitive), acoustically-sensitive (e.g., surface acoustic wave), photo-sensitive (e.g., infrared), and/or any other type of touch panel that allows a display to be used as an input device. In other implementations, the touch panel may include multiple touch-sensitive technologies. Generally, the touch panel may include any kind of technology that provides the ability to identify the occurrence of a touch upon the display device.

In one exemplary implementation, device 100 may include a dual display device, as shown in FIG. 1, where device 100 includes a first display 105 and a second display 110 interconnected by a hinge mechanism 112 that permits display 105 and display 110 to open and close similar to a book. Displays 105 and 110 may each include any type of touch panel display device. In one exemplary implementation, display 105 may include an e-ink display, and display 110 may include a color touch panel display device. As shown in FIG. 1, display 105 may display a page 115 of an e-book or e-magazine, where the page may include content such as text, graphics or images. In another exemplary implementation, display 105 and display 110 may not be physically connected to one another (e.g., via hinge mechanism 112 shown in FIG. 1), but may be "tethered" to operate as a pair by communicating with one another without having any physical interconnection. Such communication may be conducted via, for example, Bluetooth.

Display 110 may display a menu 120 of applications that may be selected by a user of device 100 to obtain information related to portions of the content of page 115 displayed on display 105. For example, as shown in FIG. 1, the user of device 100 may sequentially highlight 125-1 through 125-3 portions of content (e.g., highlighted text shown in FIG. 1). For each highlighted portion of content of page 115, the user may select an application from menu 120 displayed on display 110 causing the selected application to be executed to obtain data related to corresponding content highlighted on page 115. To annotate the e-book or e-magazine, selected items of data from the data obtained by the executed application may be attached, in a bookmark fashion, to the highlighted portions of content on page 115. Attaching the selected items of data in bookmark fashion to the e-book or e-magazine may include linking the selected items of data to the highlighted content in the e-book or e-magazine to create annotations that may stored in conjunction with the e-book or e-magazine. For example, if the user highlights a given word on page 115 on display 105, and selects and executes a dictionary application, the user may select one or more of the dictionary definitions of the given word from the executed dictionary application, and may attach the one or more definitions to the highlighted word on page 115. Attaching the data obtained by the executed application to a highlighted portion of content on page 115 may be performed by the user in various ways. In one exemplary implementation, the user may "drag and drop" selected items of data obtained by the executed application onto to the appropriate highlighted content on page 115. For example, referring to the example above, the user may select a definition of a word from an executed dictionary application, and may drag the definition over to the highlighted word on page 115 of display 105 to drop the definition on the highlighted word. Dropping the definition on the highlighted word may cause the definition to be attached, in a bookmark fashion, to the highlighted word.

Applications displayed on menu 120 may include a web text search application, an image search application, a video search application, an audio search application, a geographic mapping application, a navigation application, a dictionary application, a translation application, or a user comment application. Execution of the text search application enables search results to be located (e.g., on the web) that relate to the corresponding content highlighted on page 115 by the user. Execution of the image search application enables images to be located (e.g., on the web) that relate to the corresponding content highlighted on page 115 by the user. Execution of the video search application enables video files to be located (e.g., on the web) that relate to the corresponding content highlighted on page 115 by the user. Execution of the audio search application enables audio files to be located (e.g., on the web) that relate to the corresponding content highlighted on page 115 by the user. Execution of the geographic mapping application enables geographic maps to be retrieved (e.g., from the web) that relate to the corresponding content highlighted on page 115 by the user. Execution of the navigation application enables navigation data (i.e., data describing geographic navigation from one geographic location to another) to be retrieved (e.g., from the web) that relates to the corresponding content highlighted on page 115 by the user. Execution of the dictionary application enables one or more dictionary definitions to be retrieved (e.g., from the web) that relate to the corresponding content highlighted on page 115 by the user. Execution of the translation application enables textual content highlighted on page 115 by the user to be translated to a different user-selected language. Execution of the user comment application enables the user to enter comments (e.g., textual, audio, and/or video) that the user may have regarding the corresponding content highlighted on page 115 or to view comments from other users. Other types of applications, not specifically described herein, may also be accessible via menu 120. For example, an "ask other" application may be accessible via menu 120 that obtains data regarding the highlighted content from other users. While applications may obtain data from the web, other sources are possible.

In an alternative, second exemplary implementation, device 100 may include a single display device, as shown in FIG. 2, where device 100 includes only a single display 205. The single display 205 of device 100 of FIG. 2 may display a page 210 of an e-book or e-magazine. In addition to page 210, display 205 may display a menu 220 of applications that may be selected by a user of device 100 to obtain information related to portions of the content of page 210 displayed on display 205. For example, as shown in FIG. 2, the user of device 100 may sequentially highlight 215-1 through 215-3 portions of content (e.g., highlighted text shown in FIG. 2). For each highlighted portion of content of page 210 of the e-book or e-magazine, the user may select an application from menu 220 displayed on display 205 causing the selected application to be executed to obtain data related to corresponding content highlighted on page 115. Selected items of data from the data obtained by the executed application may be attached, in a bookmark fashion, to the highlighted portions of content on page 210, as described above with respect to page 115, to annotate the e-book or e-magazine.

Figure 3A:
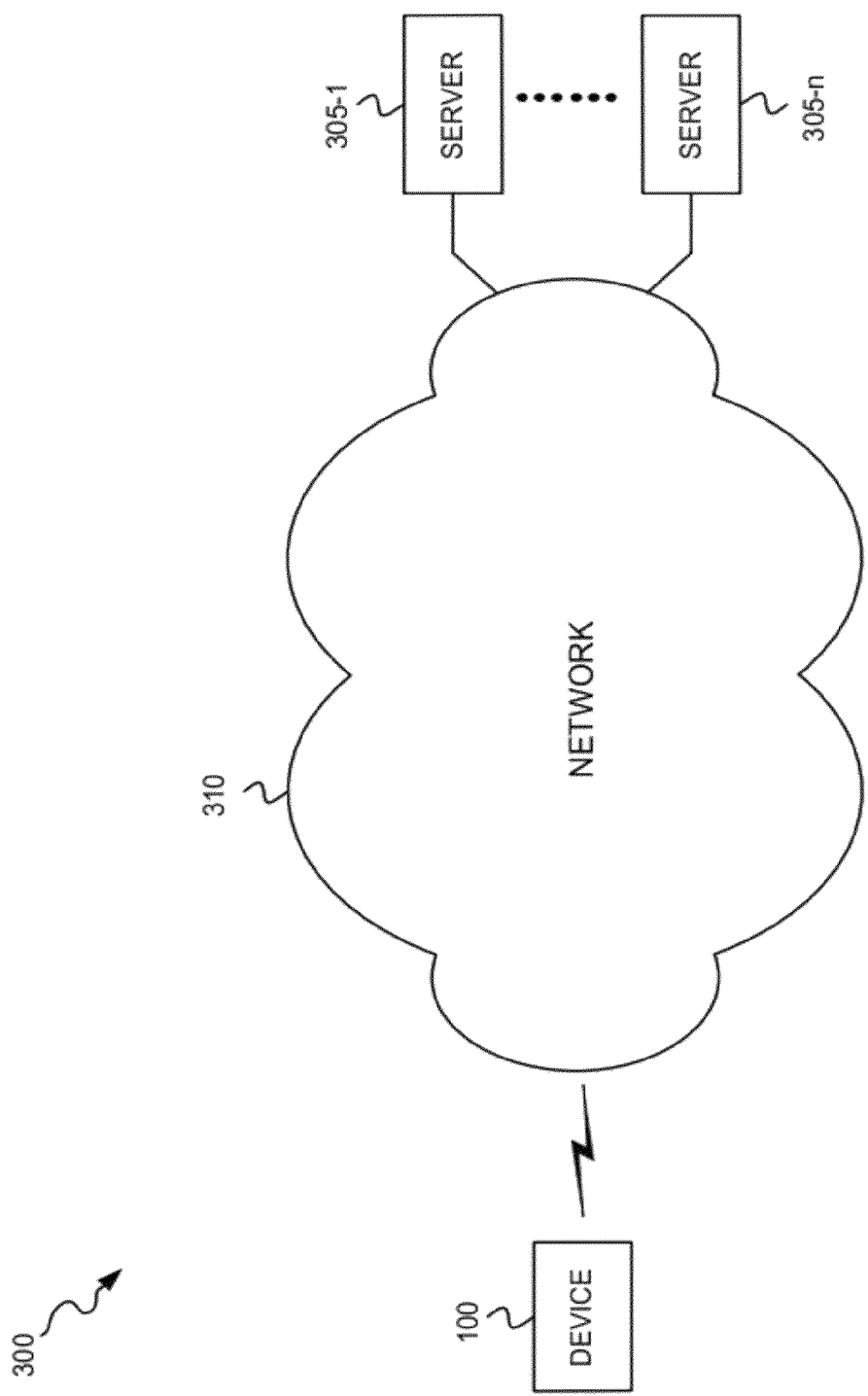
FIG. 3A depicts an exemplary environment in which the device of FIG. 1 or 2 may operate to annotate e-books or e-magazines.

FIG. 3A depicts in exemplary environment 300 in which device 100 may operate to annotate e-books or e-magazines. As shown in FIG. 3A, environment 300 may include device 100, one or more servers 305-1 through 305-n (where n equals an integer greater than or equal to 1), and network 310.

Device 100 may include, as described above, any type of device that may display and annotate an e-book or e-magazine and which may include a communication interface that enables device 100 to interconnect with an external network. Device 100 may include, for example, a cellular radiotelephone; a desktop, laptop, palmtop or tablet computer; a personal digital assistant (PDA); or a dedicated e-reader or e-book device having a communication interface. Though only one device 100 is depicted in FIGS. 3A and 3B for purposes of illustration, multiple different devices 100 may connect to network 310 to interact with servers 305-1 through 305-n.

Servers 305-1 through 305-n may each include server entities that may execute various functions based on the execution of corresponding applications at device 100. Such functions may include, for example, text searching, image searching, video file searching, audio file searching, the provision of electronic maps, the provision of navigation information, dictionary searching, and/or language translation. Servers 305-1 through 305-n may execute the various functions based on data and function requests received via applications executed at device 100. The data may include, for example, content highlighted in an e-book or e-magazine (e.g., textual content). Servers 305-1 through 305-n, upon receiving the data via applications executed at device 100, may execute functions corresponding to the function request received from device 100. For example, device 100 may send text highlighted by the user in an e-book or e-magazine to a server along with a text searching function request. The server may perform a text search of a corpus of data to return items of data (e.g., search results) related to the results of the text search performed using the text sent by device 100. One or more of servers 305-1 through 305-n may also store e-books/e-magazines and/or corresponding annotations received from device 100.

Network 310 may include one or more networks of any type, such as, for example, a telecommunications network (e.g., a Public Switched Telephone Network (PSTN)), a local area network (LAN), a wide area network (WAN), a metropolitan area network (MAN), an intranet, the Internet, a wireless satellite network, a cable network (e.g., an optical cable network), and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

Figure 3B:
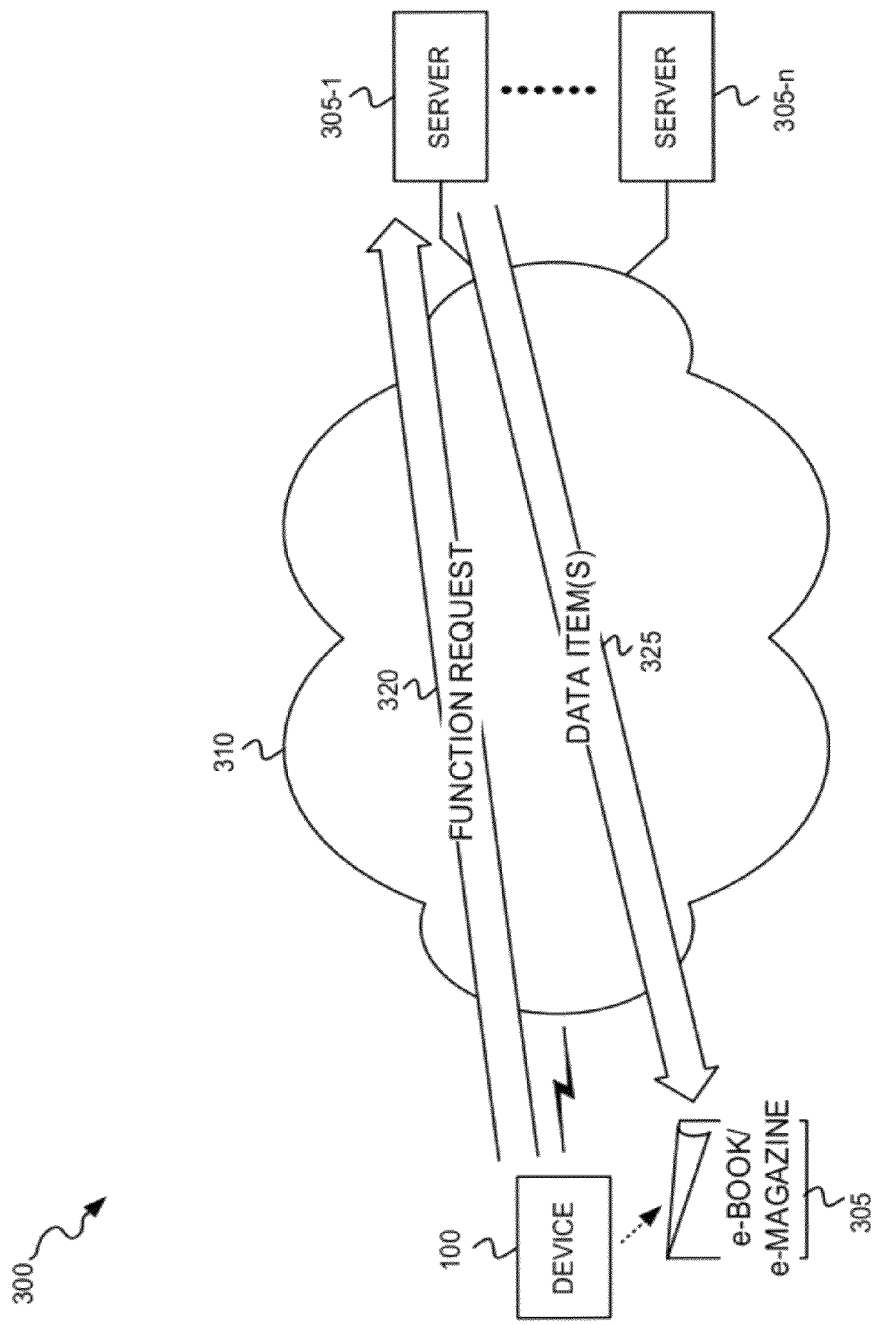
FIG. 3B further depicts the device of FIG. 1 or 2 interacting with the servers of FIG. 3A via a network.

FIG. 3B further depicts device 100 interacting with server 305-1 of servers 305-1 through 305-n via network 310. As shown in FIG. 3B, device 100 may display an e-book or e-magazine 305. Device 100 may receive the selection of content of e-book/e-magazine 305 from a user of device 100 (not shown). Device 100 may also send a function request 320, along with the selected content, to a server of servers 305-1 through 305-n (e.g., server 305-1 shown in FIG. 3B as an example). The server receiving function request 320 may execute the requested function based on the selected content received from device 100, and may return one or more items of data 325 to device 100 that are related to the selected content. For example, if device 100 requests a text search function to be performed by a server based on specific text, the server may return multiple items of data that each includes a search result related to the text. In the case of a user comment entry application being executed at device 100, function request 320 to one of servers 305-1 through 305-n may not be necessary as all comments may be supplied by the user.

FIG. 4 is a diagram of exemplary components of device 100. Servers 305-1 through 305-n may be similarly configured. Device 100 may include a bus 410, a processing unit 420, a main memory 430, a read only memory (ROM) 440, a storage device 450, an input device(s) 460, an output device(s) 470, and a communication interface 480. Bus 410 may include a path that permits communication among the components of device 100.

Processing unit 420 may include a processor, microprocessor, or processing logic that may interpret and execute instructions. Main memory 430 may include a random access memory (RAM) or another type of dynamic storage device that may store information and instructions for execution by processing unit 420. ROM 440 may include a ROM device or another type of static storage device that may store static information and instructions for use by processing unit 420.

Storage device 450 may include a magnetic and/or optical recording medium and its corresponding drive.

Input device(s) 460 may permit an operator to input information to device 100, such as, for example, one or more displays having touch panels, a keypad or a keyboard, voice recognition and/or biometric mechanisms, etc. Output device(s) 470 may output information to the operator, including a display, a speaker, one or more displays, etc. Communication interface 480 may include a transceiver that enables device 100 to communicate with other devices and/or systems. For example, communication interface 480 may include mechanisms for communicating with another device or system via a network, such as communicating with servers 305-1 through 305-n via network 310. As a specific example, communication interface 480 may include a wireless radio transceiver for communicating with servers 305-1 through 305-n via a wireless network (e.g., via a cellular PLMN).

Device 100 may perform certain operations or processes, or may implement certain functional modules, as may be described herein. Device 100 may perform these operations in response to processing unit 420 executing software instructions contained in a computer-readable medium, such as memory 430. A computer-readable medium may be defined as a physical or logical memory device. A logical memory device may include memory space within a single physical memory device or spread across multiple physical memory devices. Device 100 may use various different operating systems such as, for example, Android, Apple i operating system, Linux, Windows Phone 7, Windows 7, or Meego, among other operating systems.

The software instructions may be read into main memory 430 from another computer-readable medium, such as storage device 450, or from another device via communication interface 480. The software instructions contained in main memory 430 may cause processing unit 420 to perform operations or processes, or to implement functional modules, that are described herein. Alternatively, hardwired circuitry may be used in place of or in combination with software instructions to implement processes described herein. Thus, exemplary implementations are not limited to any specific combination of hardware circuitry and software.

The configuration of components of device 100 illustrated in FIG. 4 is for illustrative purposes only. It should be understood that other configurations may be implemented. Therefore, device 100 may include additional, fewer and/or different components than those depicted in FIG. 4.

FIG. 5 is a diagram that depicts exemplary functional components (i.e., functional modules) of device 100. The functional modules depicted in FIG. 5 may be implemented by processing unit 420, possibly in conjunction with other components of device 100. Device 100 may include an e-book/e-magazine annotation module 500, a user interface (I/F) module 510, and a storage module 520.

e-book/e-magazine annotation module 500 may interact with user I/F module 510 to annotate an e-book or e-magazine. e-book/e-magazine annotation module 500 may receive content of the e-book or e-magazine, from user I/F module 510, selected by the user (e.g., highlighted). e-book/e-magazine module 500 may instruct user I/F module 510 to provide a menu of applications to the user (e.g., menu 120 or 220 of FIGS. 1 and 2). e-book/e-magazine module 500 may receive data items that result from execution of an application selected by the user via the menu of applications, and may attach, in a bookmark fashion, user selected ones of the data items to the content selected by the user to create annotations of the content of the e-book or e-magazine.

User I/F module 510 may provide a graphical user interface (GUI) to a user of device 100 via one or more displays (e.g., displays 105 and 110). User I/F module 510 may receive selections of content from a displayed e-book/e-magazine and may pass the selections of content to annotation module 500. User I/F module 510 may receive instructions from annotation module 500 to display a menu of applications to the user, and may receive selection of one or more of the applications. Module 510 may execute the selected one or more applications and may send a function request, and user-selected content from the e-book/e-magazine to one or more of servers 305-1 through 305-n. Module 510 may receive items of data back from the one or more servers, and may further receive a selection of one or more of the items of data from the user via the GUI. The user-selected one or more of the items of data may be passed to annotation module 500 for annotating the e-book/e-magazine.

Storage module 520 may store the data items attached in a bookmark fashion to the e-book/e-magazine. Storage module 520 may store the data items as annotations of the corresponding e-book/e-magazine in main memory 430 or storage device 450 of device 100.

Exemplary Process

Figure 6A:
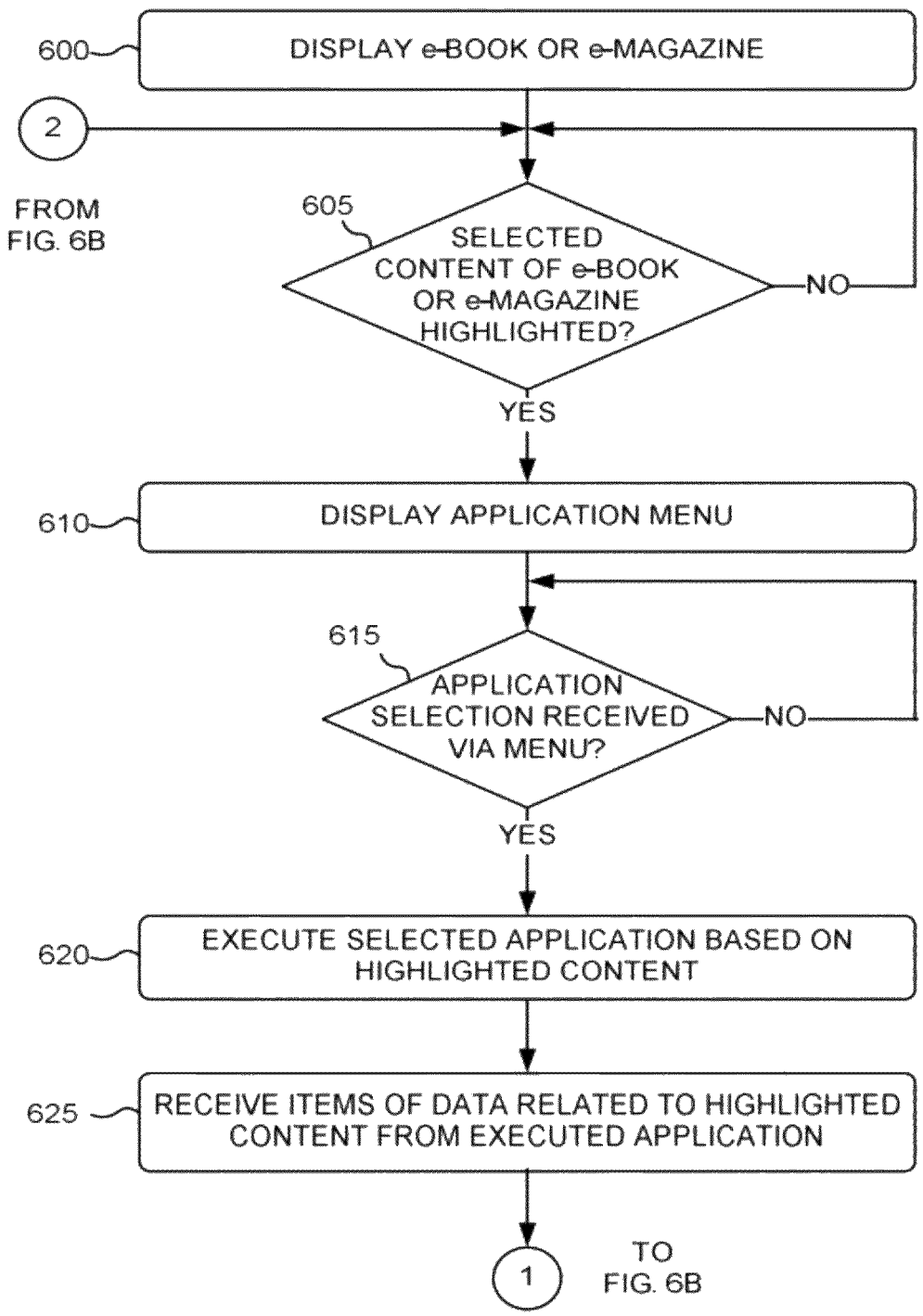
FIGS. 6A and 6B are flow diagrams illustrating an exemplary process for annotating an e-book or e-magazine.
Figure 6B:
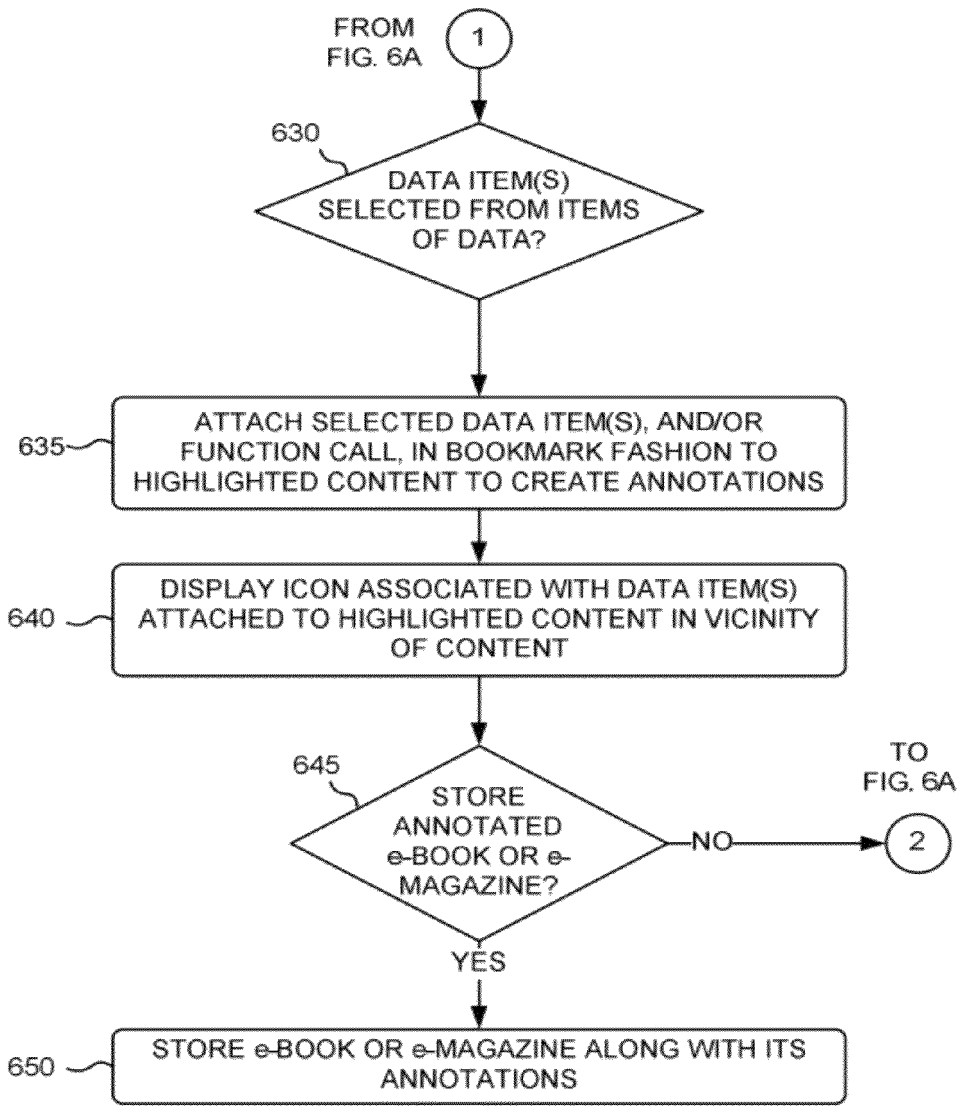
Figure 7:
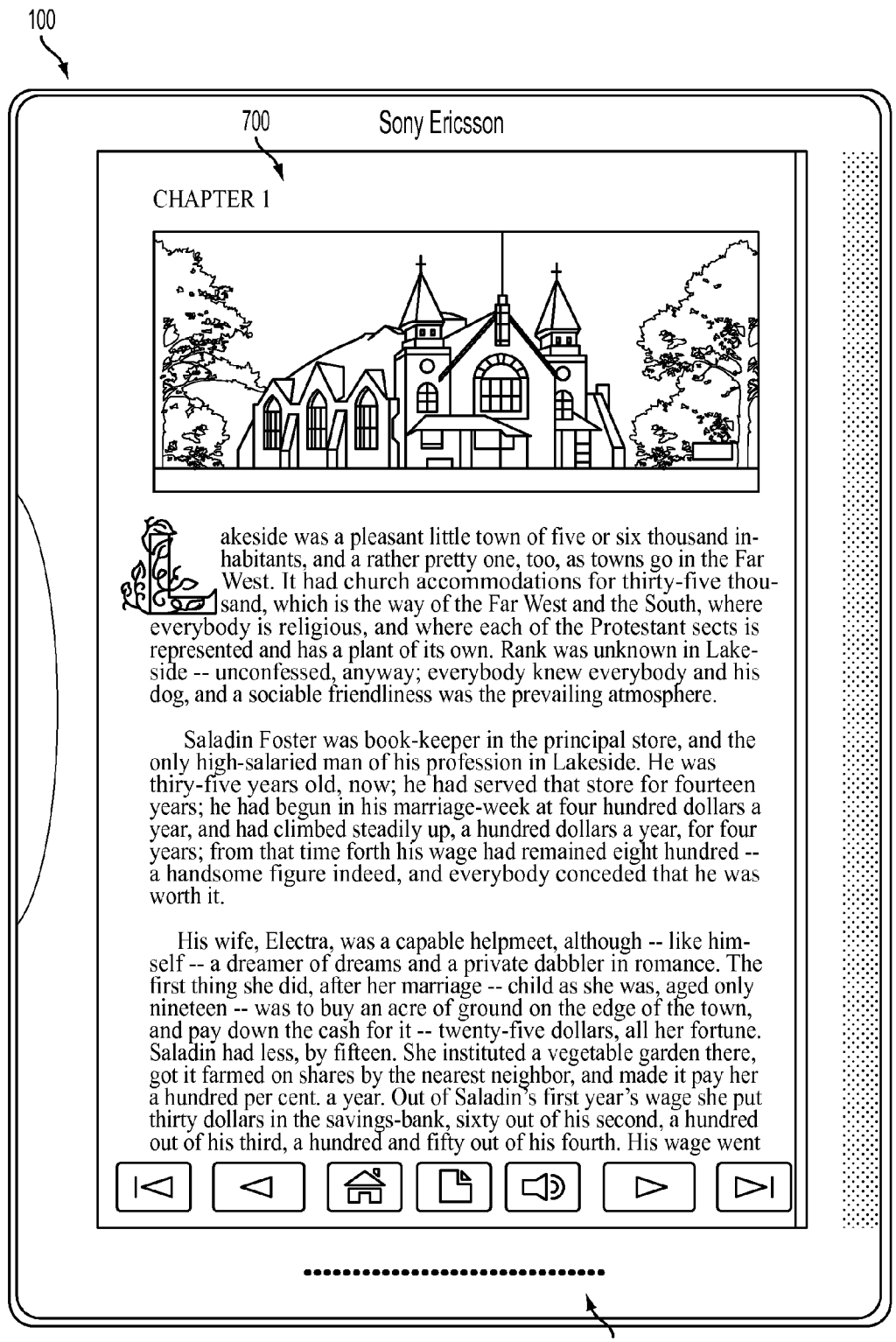
FIGS. 7-18 depict various examples of annotating an e-book or e-magazine using the exemplary process of FIGS. 6A and 6B.
Figure 8:
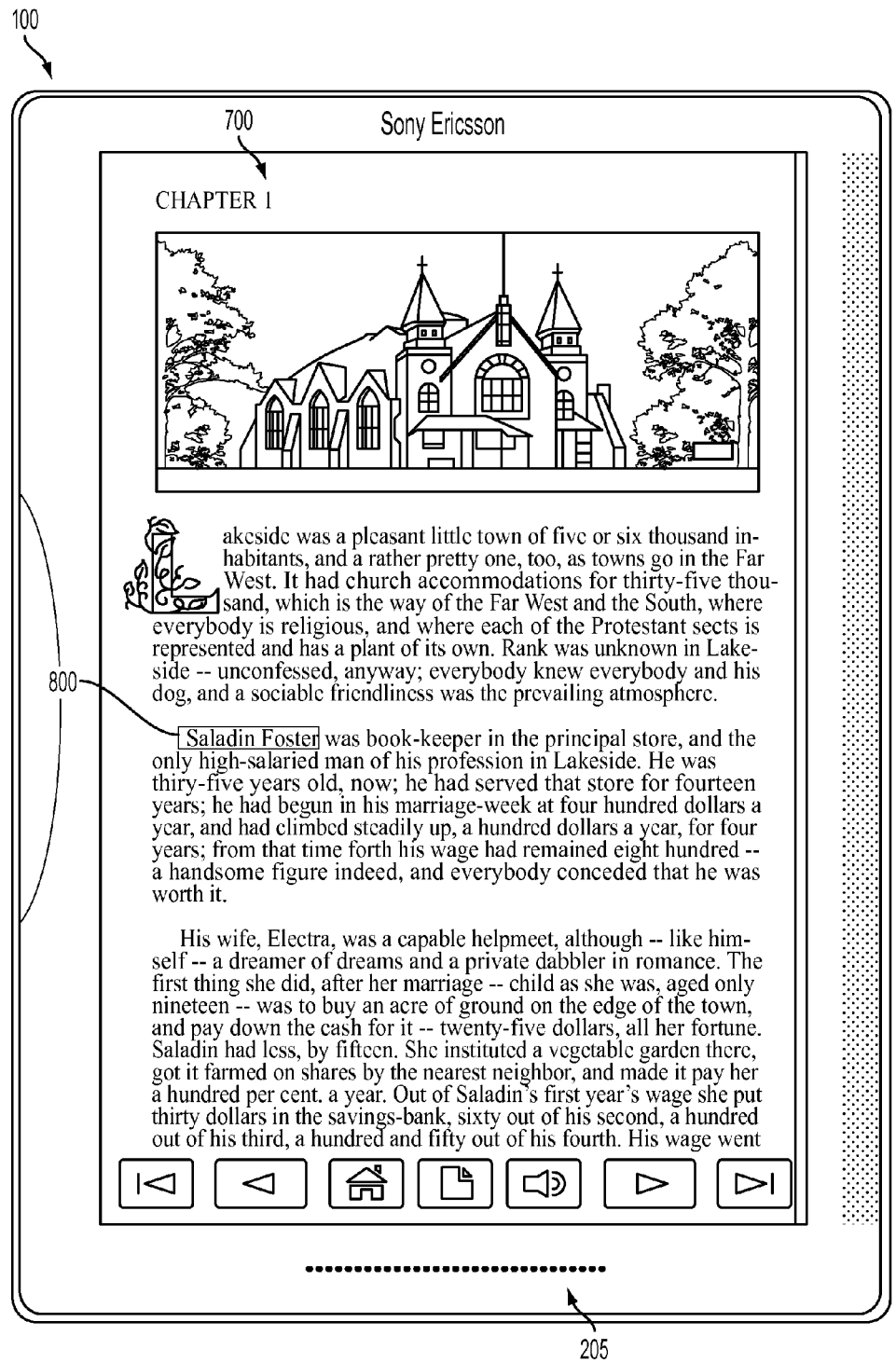

FIGS. 6A and 6B are flow diagrams illustrating an exemplary process for annotating an e-book or e-magazine. The exemplary process of FIGS. 6A and 6B may be performed by various components of device 100. The exemplary process of FIGS. 6A and 6B is described below with reference to FIGS. 7-17 which depict various examples of annotating an e-book or e-magazine.

The exemplary process may include displaying an e-book or e-magazine (block 600). Referring back to FIGS. 1 and 2, device 100 may display a page of the e-book or e-magazine via display 105 or via display 205. The e-book or e-magazine may be retrieved from memory (e.g., storage device 450, main memory 430), or may be received via communication interface 480 and network 310. For example, referring to the example of FIG. 7, device 100 may obtain an e-book and display a page 700 of the e-book via display 205. It may be determined if selected content of the e-book or e-magazine has been highlighted by the user (block 605). The user may select specific content from the e-book or e-magazine by, for example, touching the content on display 205, thereby causing the content to be highlighted. The selected content may include, for example, text, graphics or images. Referring to the example of FIG. 8, the user has touched the text "Saladin Foster" 800 on page 700 to cause the text to be highlighted.

If selected content of the e-book or e-magazine has been highlighted by the user (YES—block 605), then an application menu may be displayed (block 610). Referring to the example of FIG. 9, a menu 900 may be displayed that includes a list of applications that can be selected by the user for annotating the e-book or e-magazine. Referring to an additional example shown in the dual display example of FIG. 16, a menu 1600 may be displayed in display 110 that includes a list of applications that can be selected by the user for annotating the e-book or e-magazine.

Figure 9:
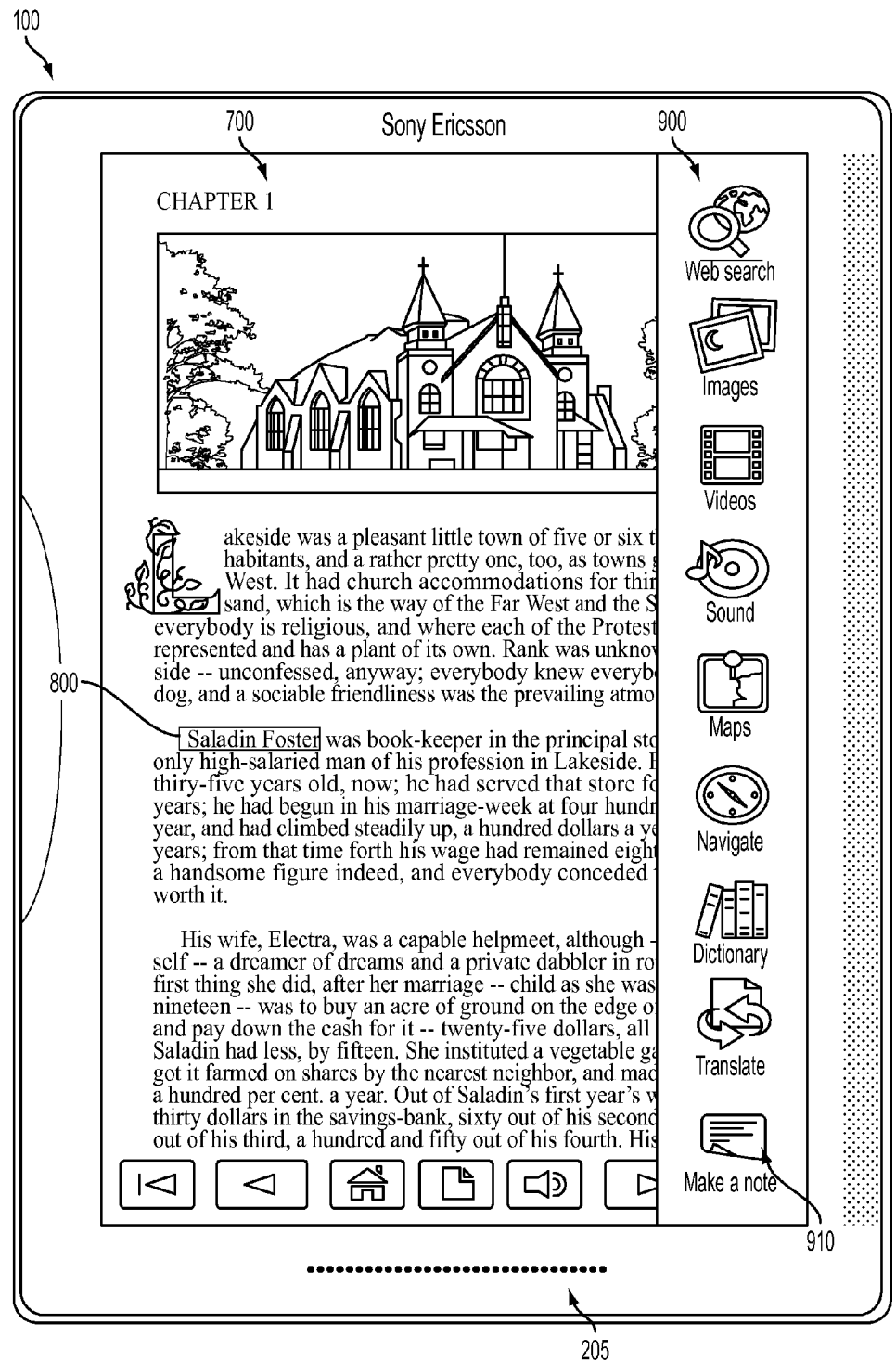
Figure 10:
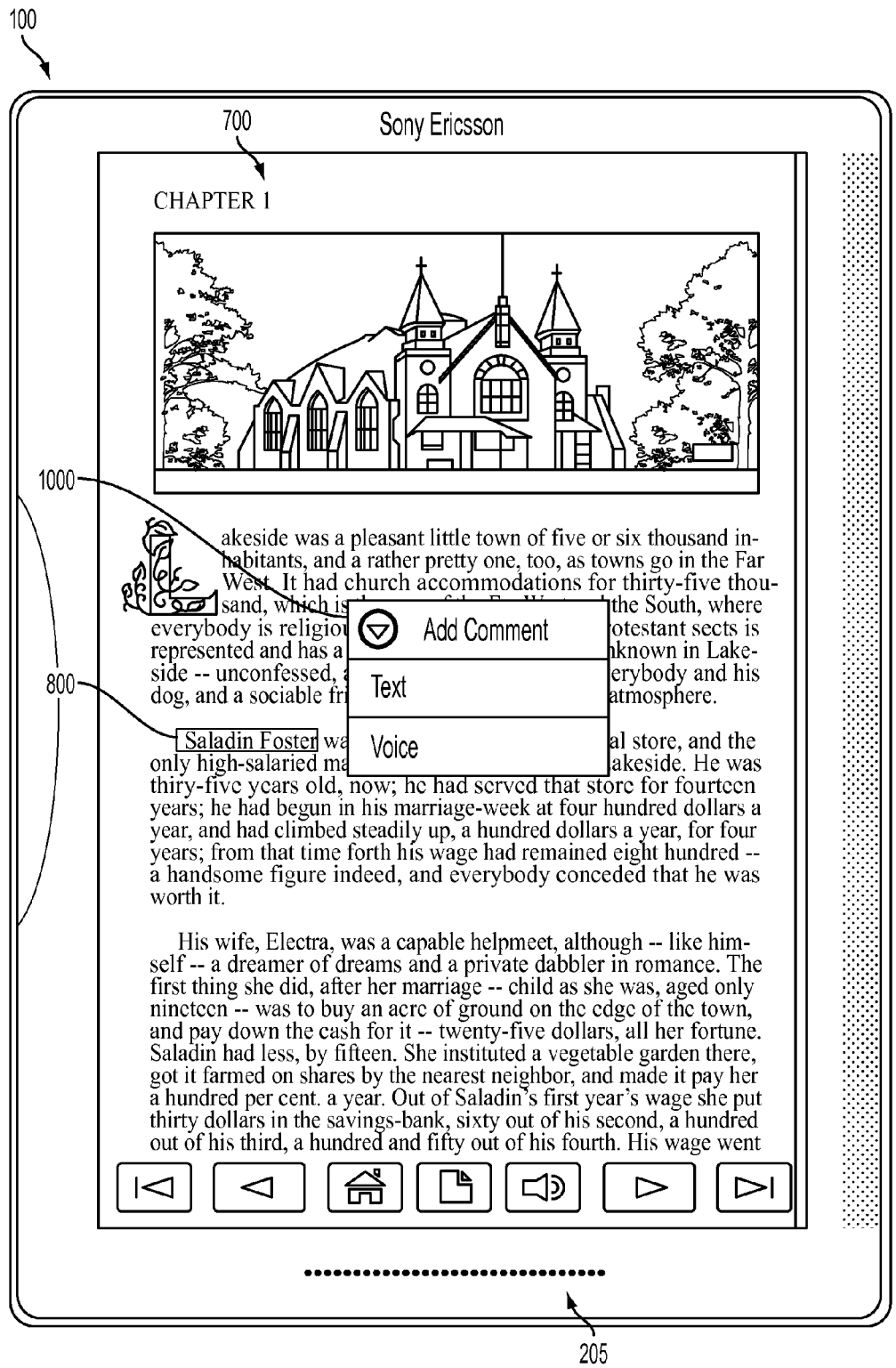
Figure 11:
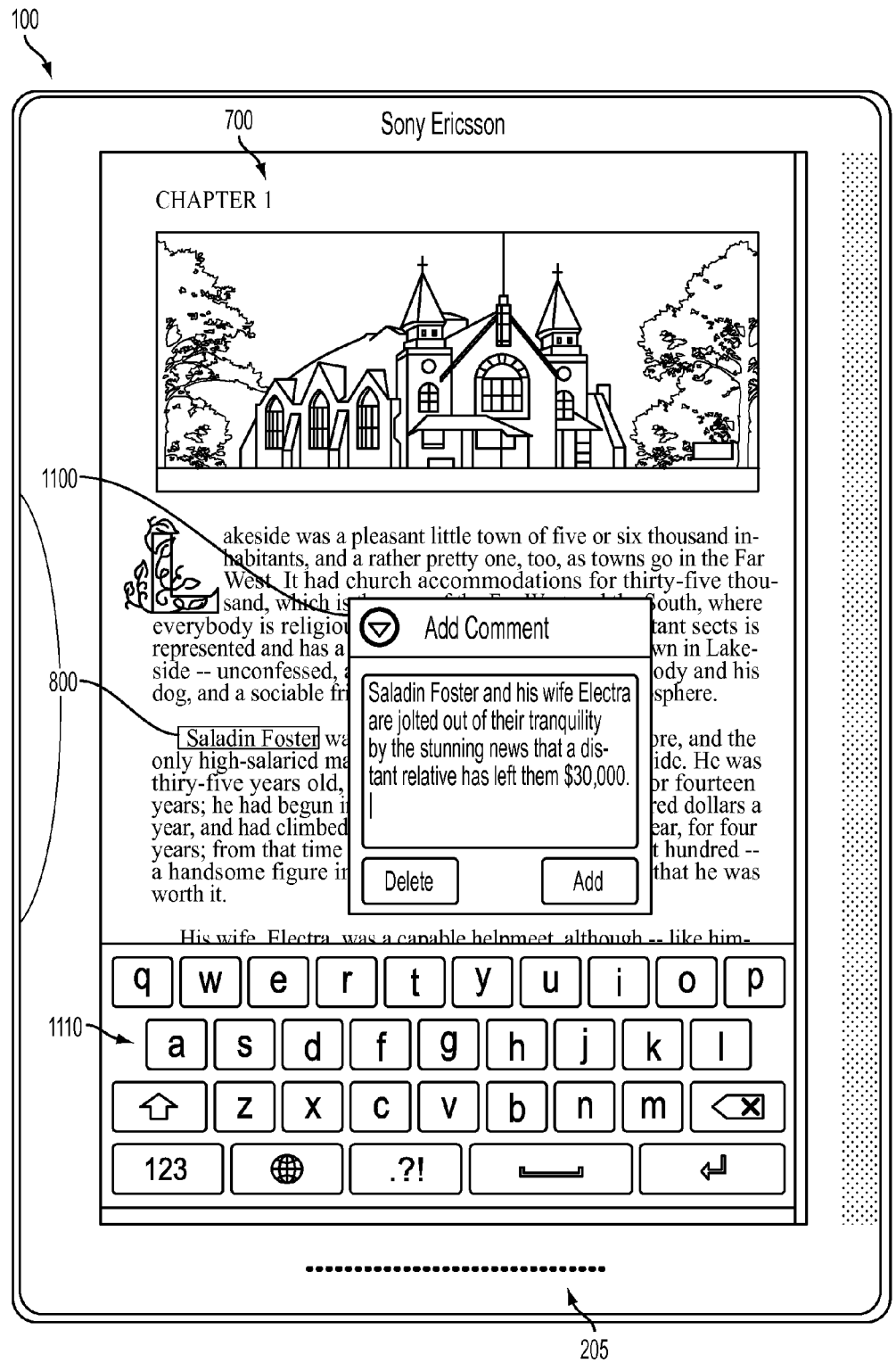

An application selection may be received via the displayed application menu (block 615). As shown in the example of FIG. 9, the user may select an application 910 from menu 900 (e.g., the user has selected the user comment entry "make a note" application). As further shown in the additional example of FIG. 16, the user may select a web search application 1610 from menu 1600 displayed in display 110.

The selected application may be executed based on the highlighted content (block 620). Processing unit 420 of device 100 may retrieve and execute the application selected by the user in block 615. With the web search applications, map application, navigation application, dictionary application, or translation application, device 100 may, during execution of the application selected by the user in block 615, send a function request to an appropriate one of servers 305-1 through 305-$n$ along with the user-selected content from the e-book or e-magazine. The function request may request the appropriate function to be performed at the server 305 based on the user-selected content. For example, if the user has selected a text searching application, then device 100 may send a function request that includes a text search request and may send textual content selected from the e-book or e-magazine. In the example of FIG. 9, after selection of the user comment entry application 910 from menu 900, a window 1000 may be displayed in display 205, as further shown in FIG. 10, which presents the user with the option to enter a text or voice comment. In another example of FIG. 13, where the annotation process is performed using dual displays 105 and 110, display 110 may display a window 1300 which presents the user with the option to enter a text or voice comment. In a further text searching example, shown in FIG. 17, execution of the "web search" application causes the highlighted content 900 (e.g., "Saladin Foster") to be pasted in a search page in display 110, such that the user may select a search button 1700 to cause the highlighted content to be sent to a text searching server for execution of a text search, based on the highlighted content, of a corpus of documents.

Figure 12:
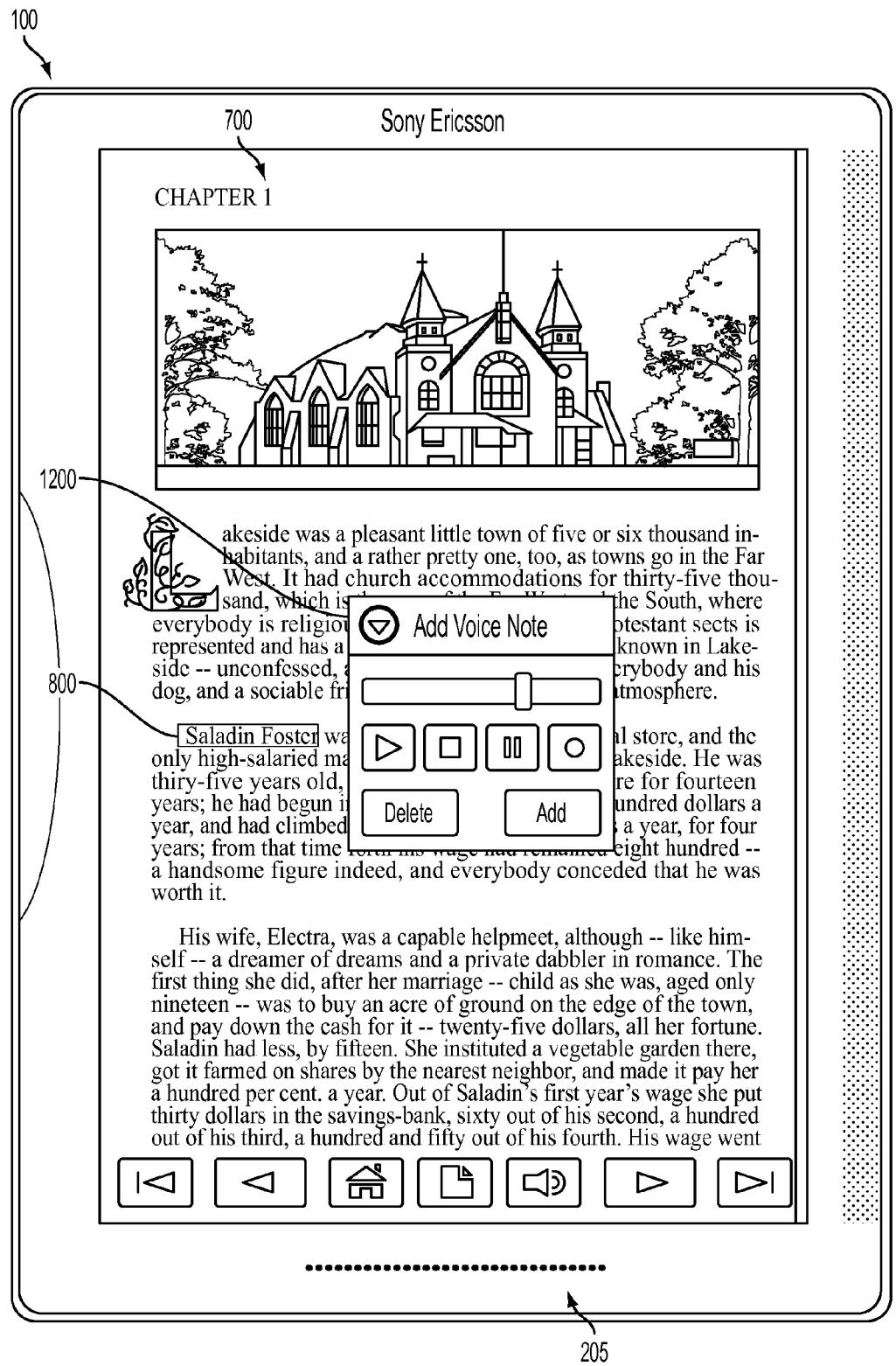
Figure 13:
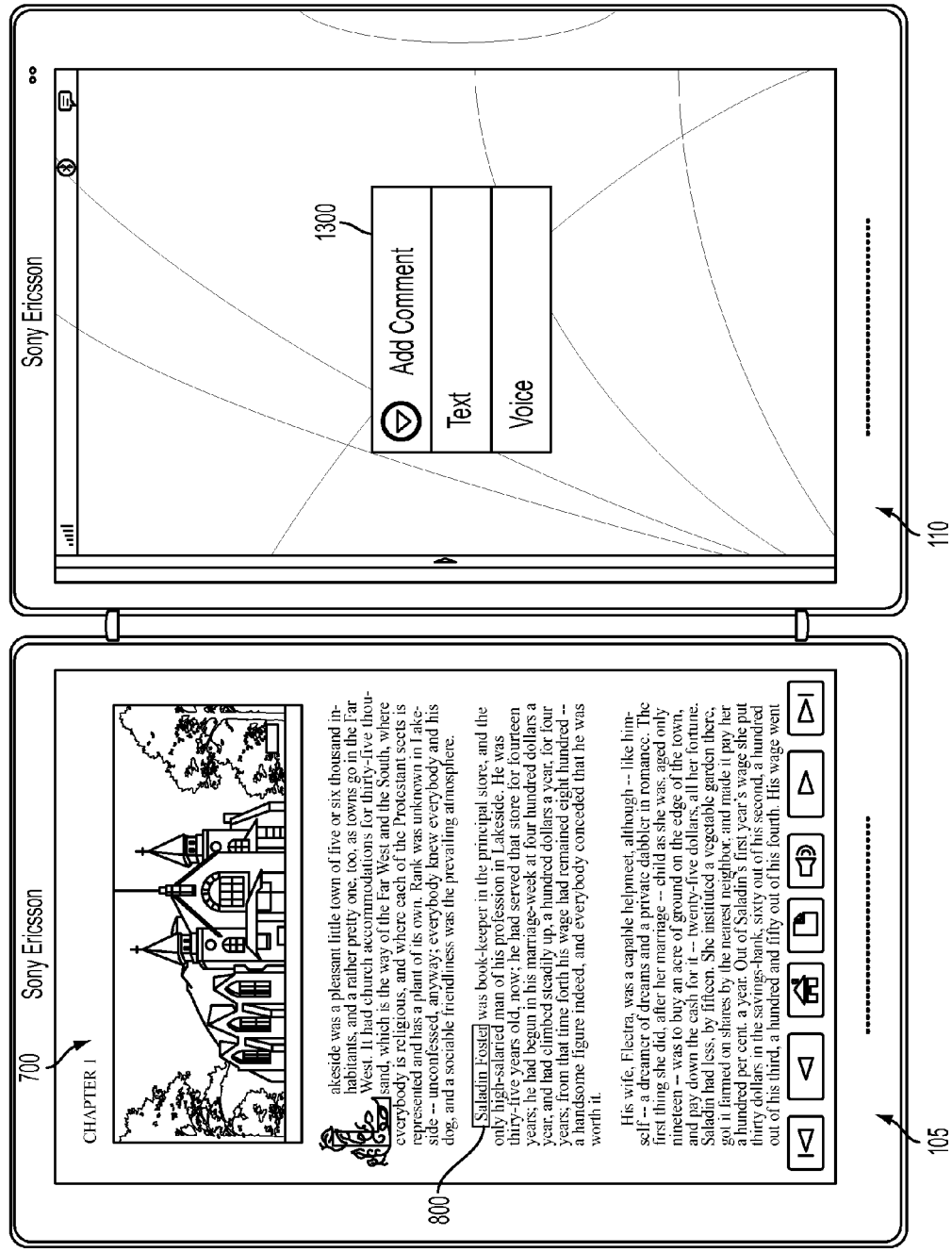
Figure 14:
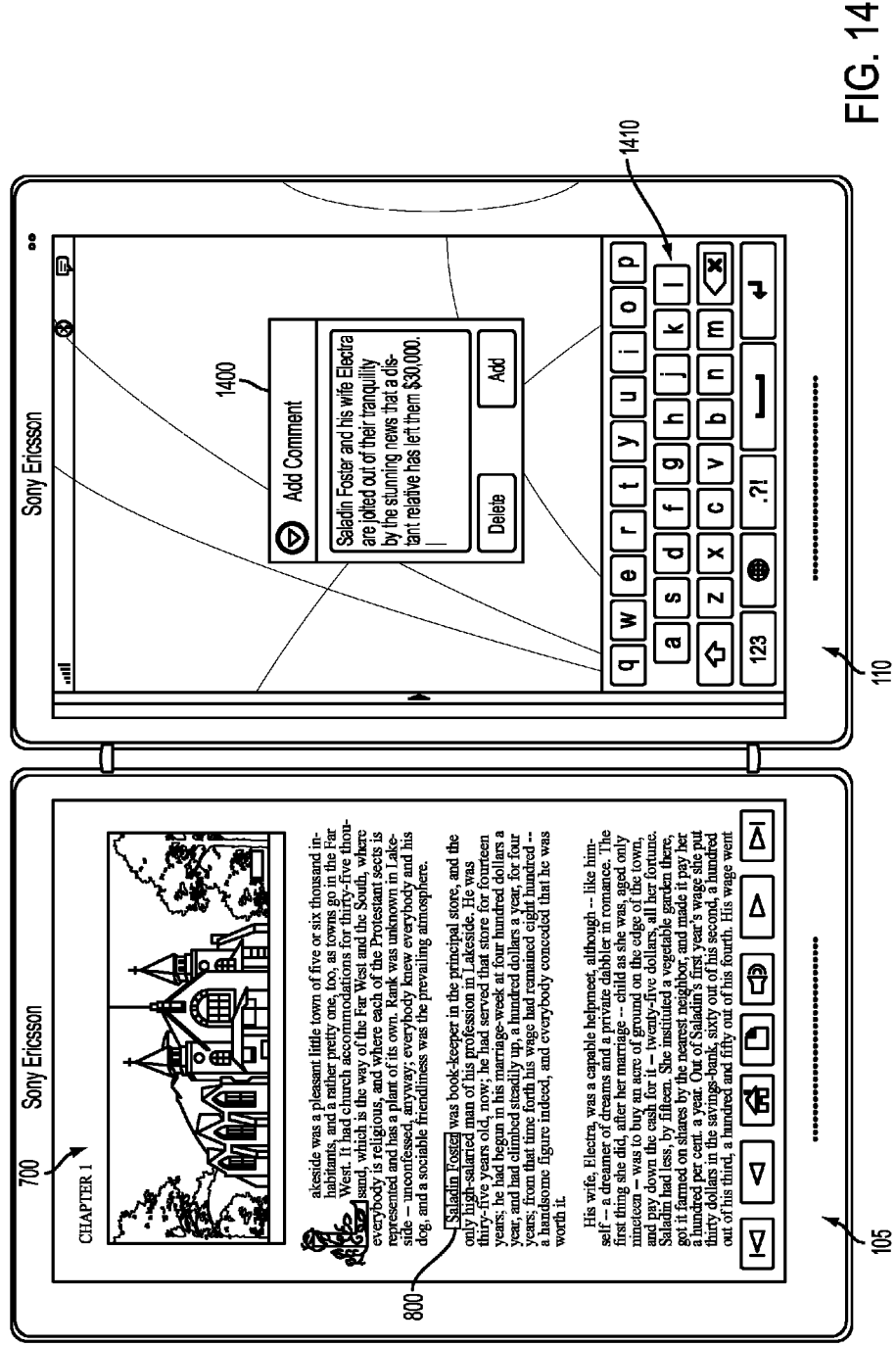
Figure 15:
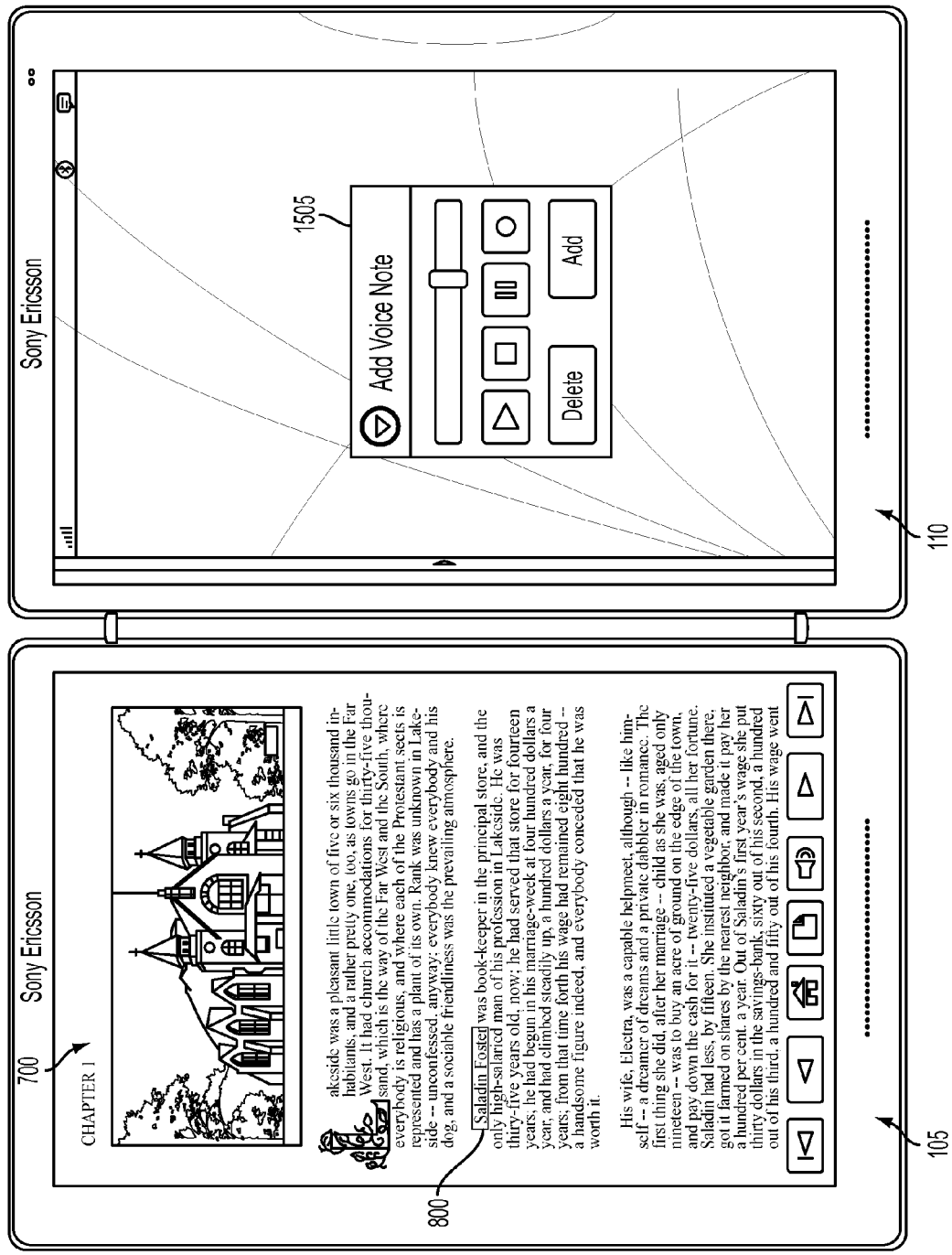
Figure 16:
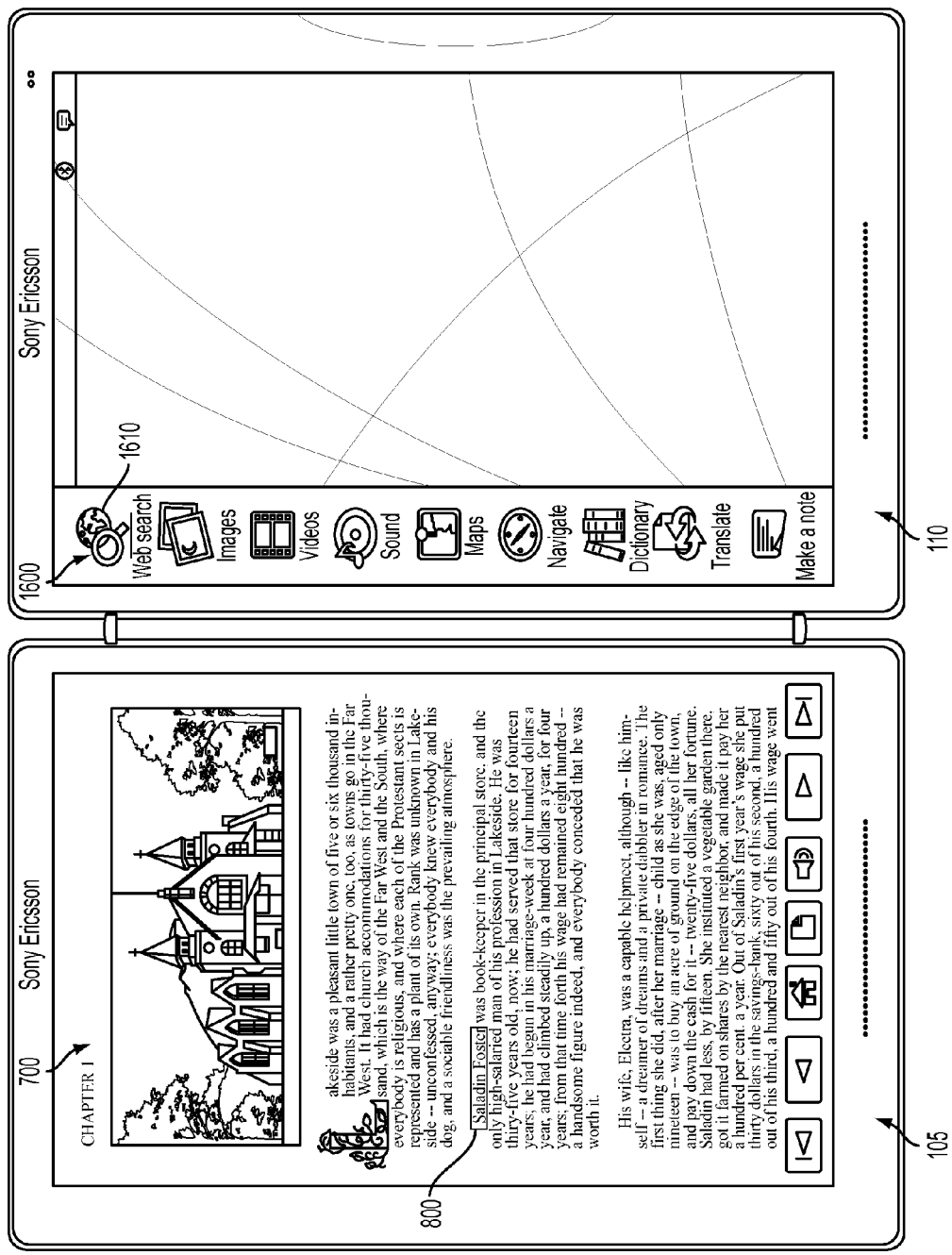
Figure 17:
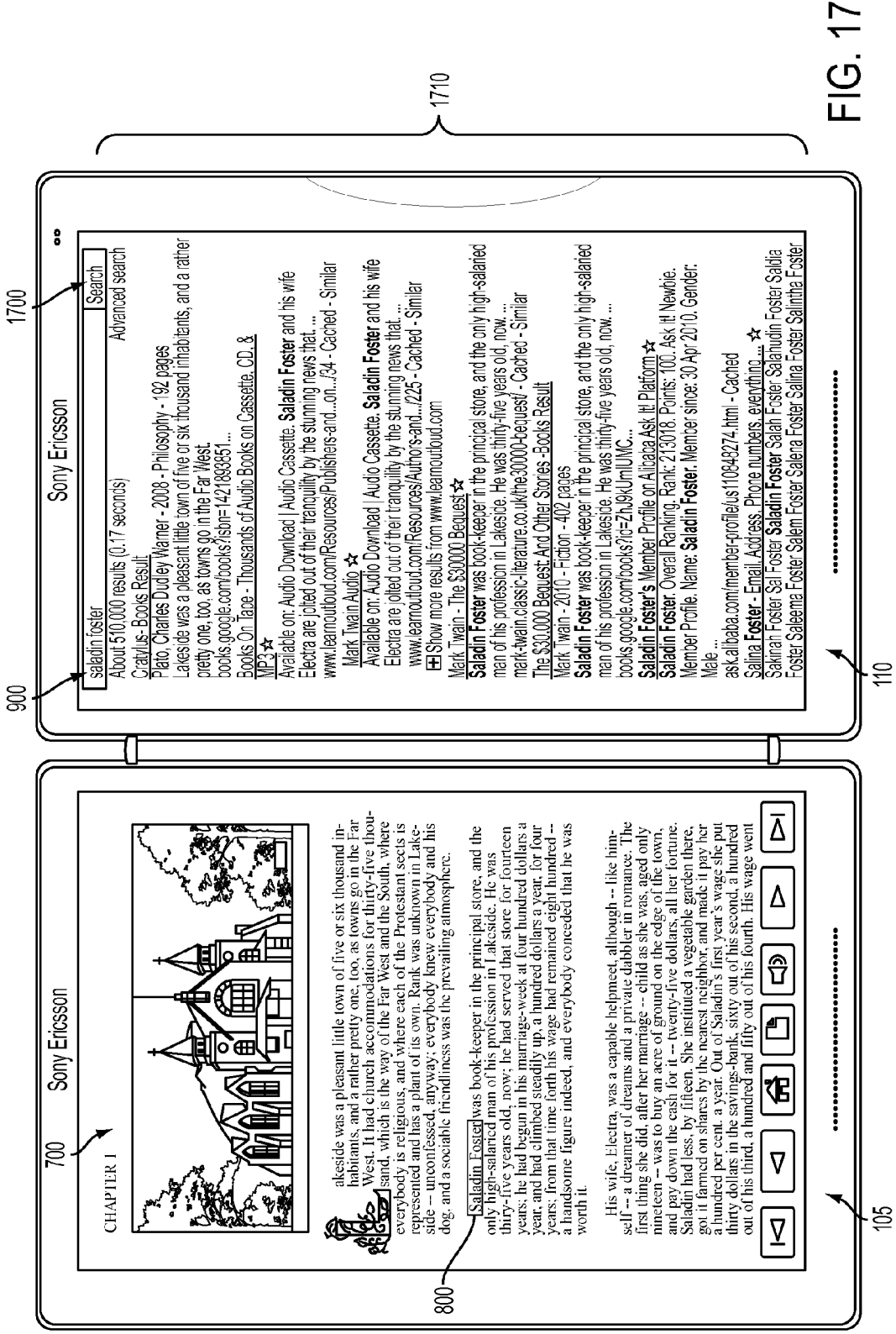

Items of data related to the highlighted content may be received from the executed application (block 620). In the case of web search applications, a map application, a navigation application, a dictionary application, or a translation application, the items of data may be received from an appropriate server of servers 305-1 through 305-$n$ for processing by the executed application. In the case of a user comment entry application, the executed application may request user entry of a voice, text or video comment. Referring to the example of FIG. 10, the user may select from entering text and/or voice comments via window 1000. As further shown in FIG. 11, if text comment entry is selected by the user, a keypad 1110 may be displayed via display 205 such that the user can enter text in a comment entry window 1100. As also shown in FIG. 12, if voice comment entry is selected by the user, a window 1200 may be displayed in display 205 that permits the user to record a voice comment. Referring to the dual display example of FIG. 13, the user may also select entry of either a text or voice comment. As shown in FIG. 14, if text comment entry is selected by the user, a keypad 1410 may be displayed via display 110 such that the user can enter text in a comment entry window 1400. As further shown in FIG. 15, if voice comment entry is selected by the user, a window 1505 may be displayed in display 110 that permits the user to record a voice comment. In the text searching example of FIG. 17, the server performing the text search based on the highlighted content may return a set of search results 1710 that user may select from to annotate the highlighted content.

It may be determined whether one or more data items are selected by the user from the items of data (block 630). In the case of web search applications, a map application, a navigation application, a dictionary application, or a translation application, multiple items of data may be received from a server 305, and the user may select one or more data items from the received multiple items of data. In the case of a user comment entry application, the user may select from voice, text and/or video comments entered by the user. Selection of the one or more data items may include, for example, the user "dragging," via a touch panel of displays 105, 110, or 205 the items of data (e.g., URLs, images, video, maps, etc.) obtained from execution of the application to drop the items of data on the portion of content highlighted by the user. Referring again to the text searching example of FIG. 17, the user may select one or more of the search results 1710 provided to device 100 by the text searching server.

The selected one or more data items may be attached to the highlighted content in bookmark fashion to create annotations (block 635). The selected items of data may be attached in bookmark fashion to the e-book or e-magazine by, for example, linking the selected items of data to the highlighted content in the e-book or e-magazine. The linked items of data create annotations of the e-book or e-magazine that may stored with a pointer to point to the corresponding content of the e-book or e-magazine. Annotation module 500 of device may attach the selected one or more data items to the highlighted content in a bookmark fashion via storage module 520. Successful attachment of the one or more data items to a highlighted portion of content may cause the highlighted content to change its appearance. For example, the highlighted content may change from a first highlighted color to a second highlighted color. In addition to attaching the one or more items, functional calls may also be attached to the highlighted content for certain applications. For example, when "translation," "dictionary," or "ask others" applications are executed, a function call may attached to the highlighted content that may permit the re-execution of the application when the annotated e-book or e-magazine is opened to be read by a user in the future. Attachment of the function call permits updated items of data (e.g., updated dictionary definitions, updated user comments, updated navigation directions, updated translations, etc.) to be obtained from servers 305-1 through 305-$n$ whenever the annotated e-book or e-magazine is opened for reading in the future.

Figure 18:
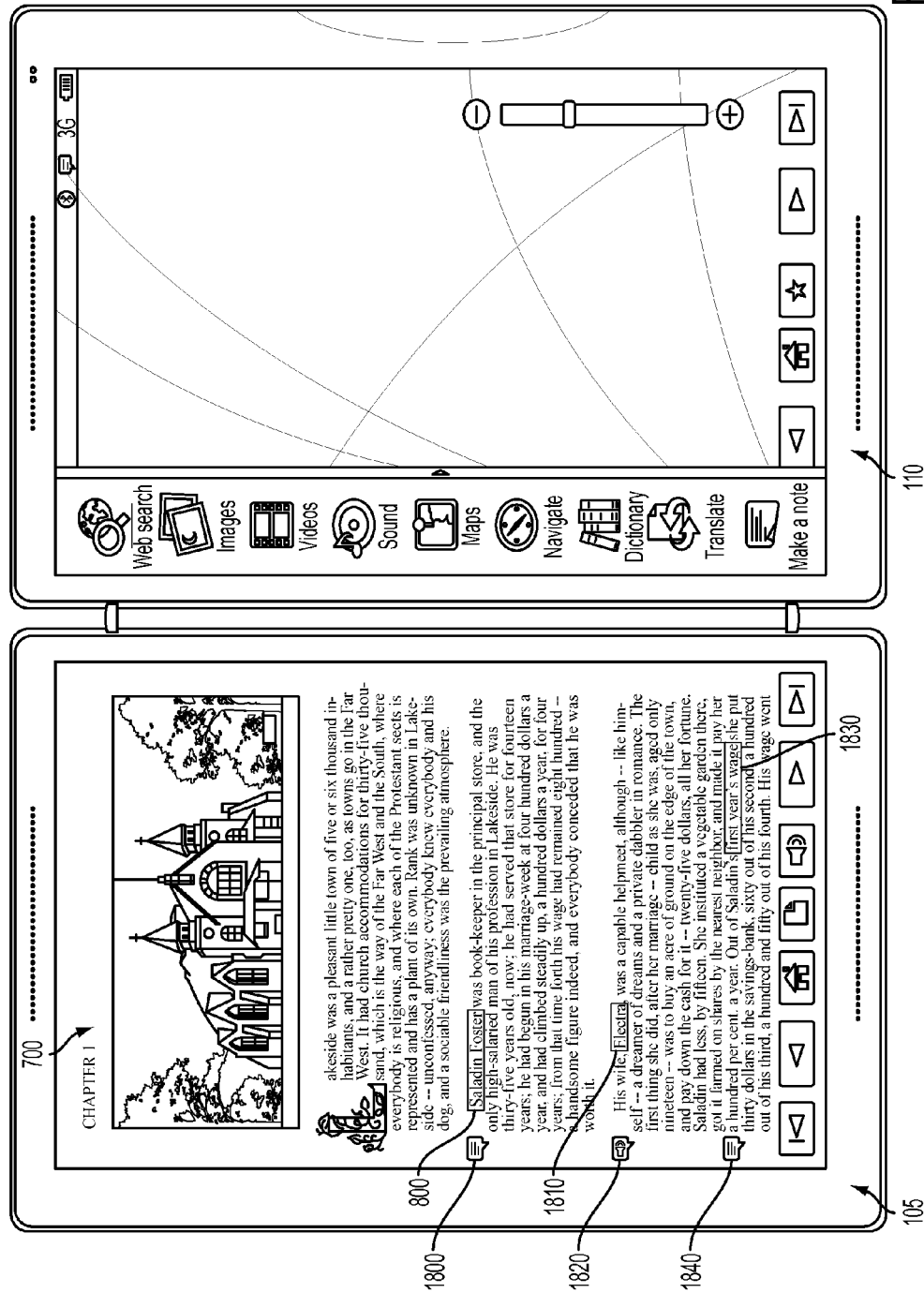

An icon associated with the selected one or more data items attached to the highlighted content may be displayed in the vicinity of the content (block 640). Data items obtained via each type of executed application may have a different icon so that the user can quickly determine what kind of annotation (e.g., search result, dictionary definition, translation, user comment, etc.) is associated with each respective highlighted portion of content. As shown in FIG. 18, various portions of content may be highlighted 800, 1810 and 1830 on a page 700 of an e-book or e-magazine. After attachment of the one or more data items in a bookmark fashion to the highlighted content, corresponding icons 1800, 1820 and 1840 may associated with each portion of highlighted content. The appearance of each different type of icon may, for example, indicate the type of data item attached to the highlighted content. For example, a translation icon may be different than a dictionary definition icon, a user comment icon may be different than a map icon, a navigation icon may be different than an audio file search icon, etc.

It may be determined whether the annotated e-book or e-magazine should be stored (block 645). During the annotation process, or subsequent to annotating the entirety of the e-book or e-magazine, the user may choose to store the annotated e-book or e-magazine. If so, the e-book or e-magazine, along with its annotations, may be stored (block 650). Annotation module 500 may cause the e-book or e-magazine, along with its annotations, to be stored in memory via storage module 520. The e-book or e-magazine, along with its annotations, may be stored, for example, in main memory 430 or storage device 450 for future retrieval. Alternatively, the e-book or e-magazine, along with its annotations, may be stored external to device 100. For example, device 100 may send the e-book or e-magazine, along with its annotations, to one of servers 305-1 through 305-*n* for storage such that the e-book or e-magazine and annotations may be shared with other users (e.g., in "reading rooms" provided by a server). Alternatively, device 100 may share the e-book or e-magazine and annotations with other users by sending it directly, via network 310, to other devices, similar to device 100, that are associated with other users.

CONCLUSION

Implementations described herein provide mechanisms for annotating an e-book or e-magazine using items of data obtained from the execution of applications that interact with external servers to obtain data related to portions of content highlighted by a user in the e-book or e-magazine. For a given highlighted portion of content of the e-book or e-magazine, the user may select one or more of the items of data obtained from execution of an application (e.g., a text searching application) and may attach the one or more items of data to the highlighted portion of content by, for example, "dragging and dropping" the one or items of data onto the highlighted portion of content.

The foregoing description of the embodiments described herein provides illustration and description, but is not intended to be exhaustive or to limit the invention to the precise form disclosed. Modifications and variations are possible in light of the above teachings or may be acquired from practice of the invention. For example, while a series of blocks has been described with respect to FIGS. 6A and 6B, the order of the blocks may be varied in other implementations. Moreover, non-dependent blocks may be performed in parallel.

Certain features described herein may be implemented as "logic" or as a "unit" that performs one or more functions. This logic or unit may include hardware, such as one or more processors, microprocessors, application specific integrated circuits, or field programmable gate arrays, software, or a combination of hardware and software.

The term "comprises" or "comprising" as used herein, including the claims, specifies the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

What is claimed is:

1. A method implemented by a processing unit of a device, comprising:
   receiving and displaying an electronic book (e-book) or an electronic magazine (e-magazine);
   receiving user selection of a first portion of content of the e-book or the e-magazine;
   executing a first application that obtains first items of data related to the selected first portion of content, wherein the first application comprises a first type of application;
   receiving selection of one or more of the first items of data;
   attaching the one or more of the first items of data to the selected first portion of the content in a bookmark fashion that creates an annotation associated with the selected first portion of the content to annotate the e-book or the e-magazine;
   receiving user selection of a second portion of content of the e-book or the e-magazine;
   executing a second application that obtains second items of data related to the selected second portion of content, wherein the second application comprises a second type of application that is different than the first type of application;
   receiving selection of one or more of the second items of data;
   attaching the one or more of the second items of data to the selected second portion of the content in a bookmark fashion that creates an annotation associated with the selected second portion of the content to annotate the e-book or e-magazine; and
   associating a different icon with each of the first and second portions of the content based on each type of the executed first and second applications.

2. The method of claim 1, wherein displaying the e-book or the e-magazine comprises:
   displaying the e-book or the e-magazine on a first display of the device having a first touch panel.

3. The method of claim 1, wherein associating the different icon with each of the first and second portions of the content based on each type of the executed first and second applications comprises:
   associating a first icon with the first portion of the content based on the first type of application; and
   associating a second icon with the second portion of the content based on the second type of application, wherein the first icon appears differently than the second icon when displayed.

4. The method of claim 3, wherein the first and second types of applications each comprise a different one of a web searching type application, a mapping type application, a navigation type application, a translation type application, a dictionary type application, or a user comment entry type application.

5. The method of claim 4, wherein the first application or the second application comprises the mapping type application and wherein the first or the second items of data comprise data, associated with a map, which is related to the selected first or second portion of content.

6. The method of claim 4, wherein the first application or the second application comprises the navigation type application and wherein the first or second items of data comprises data, associated with geographic navigation, which is related to the selected first or second portion of content.

7. The method of claim 4, wherein the first application or the second application comprises the translation type application and wherein the first or second items of data comprise data associated with translating the selected first or second portion of content from a first language to a second language.

8. The method of claim 4, wherein the first application or the second application comprises the dictionary type application and wherein the first or second items of data comprise dictionary definitions related to the selected first or second portion of content.

9. The method of claim 4, wherein the first application or the second application comprises the user comment entry type application and wherein the first or second items of data comprise user provided comments related to the selected first or second portion of content.

10. The method of claim 4, wherein the web searching type application comprises at least one of a text searching application, an image file searching application, a video file searching application, or an audio file searching application wherein the first application or the second application comprises the text searching application and wherein the first or second items of data comprise text search results related to the selected first or second portion of content, or wherein the first or the second application comprises the image file search application and wherein the first or second items of data comprise one or more image files related to the selected first or second portion of content; or wherein the first or the second application comprises the video file searching application and wherein the first or second items of data comprises one or more video files related to the selected first or second portion of content; or wherein the first or the second application comprises the audio file searching application and wherein the first or second items of data comprises one or more audio files related to the selected first or second portion of content.

11. The method of claim 4, further comprising:

displaying the first icon in a vicinity of the first portion of content when displaying a page of the e-book or e-magazine that includes the first portion of the content; and displaying the second icon in a vicinity of the second portion of content when displaying a page of the e-book or e-magazine that includes the second portion of the content.

12. The method of claim 2, further comprising:

presenting a menu of applications; and receiving user selection of the first application or the second application from the menu of applications to execute the first or the second application.

13. The method of claim 12, wherein the menu of applications is presented by displaying the menu on a second display of the device having a second touch panel.

14. The method of claim 1, further comprising:

storing the e-book or the e-magazine along with its annotations; and sending the e-book or the e-magazine, along with its annotations, to a server for sharing with other users.

15. A device, comprising:

one or more displays having one or more touch panels;

a processing unit configured to:

cause an electronic book (e-book) or an electronic magazine (e-magazine) to be displayed via the one or more displays, receive, via the one or more touch panels, user selection of a first portion of content of the e-book or the e-magazine, execute a first application that obtains first items of data related to the selected first portion of content, wherein the first application comprises a first type of application, receive, via the one or more touch panels, selection of one or more of the first items of data, attach the one or more of the first items of data to the selected first portion of the content in a bookmark fashion that creates an annotation associated with the selected first portion of the content to annotate the e-book or the e-magazine, receive, via the one or more touch panels, user selection of a second portion of content of the e-book or the e-magazine, execute a second application that obtains second items of data related to the selected second portion of content, wherein the second application comprises a second type of application that is different than the first type of application, receive, via the one or more touch panels, selection of one or more of the second items of data, attach the one or more of the second items of data to the selected second portion of the content in a bookmark fashion that creates an annotation associated with the selected second portion of the content to annotate the e-book or e-magazine, and associate a different icon with each of the first and second portions of the content based on each type of the executed first and second applications.

16. The device of claim 15, wherein, when causing the e-book or the e-magazine to be displayed via the one or more displays, the processing unit is further configured to:

cause the e-book or the e-magazine to be displayed via a first display, of the one or more displays, having a first touch panel.

17. The device of claim 16, wherein the processing unit is further configured to:

cause a menu of applications to be displayed via the first display or a second display of the one or more displays, and receive, via the one or more touch panels, user selection of the first application or the second application from the menu of applications to execute the first or the second application.

18. The device of claim 15, further comprising:

a communication interface configured to communicate via an external network, wherein the processing unit is further configured to:

store the e-book or the e-magazine along with its annotations, and cause the e-book or the e-magazine, along with its annotations, to be sent, via the communication interface, to a server for sharing with other users.

19. The device of claim 15, wherein, when associating the different icon with each of the first and second portions of the content based on each type of the executed first and second applications, the processing unit is further configured to:

associate a first icon with the first portion of the content based on the first type of application, and associate a second icon with the second portion of the content based on the second type of application, wherein the first icon appears differently than the second icon when displayed.

20. The device of claim 19, wherein the first and second types of applications each comprise a different one of a web searching type application, a mapping type application, a navigation type application, a translation type application, a dictionary type application, or a user comment entry type application.

21. The device of claim 20, wherein the first application or the second application comprises the mapping type application and wherein the first or the second items of data comprise data, associated with a map, which is related to the selected first or second portion of content, or wherein the first application or the second application comprises the navigation type application and wherein the first or second items of data comprises data, associated with geographic navigation, which is related to the selected first or second portion of content, or wherein the first application or the second application comprises the translation type application and wherein the first or second items of data comprise data associated with translating the selected first or second portion of content from a first language to a second language, or wherein the first application or the second application comprises the dictionary type application and wherein the first or second items of data comprise dictionary definitions related to the selected first or second portion of content, or wherein the first application or the second application comprises the user comment entry type application and wherein the first or second items of data comprise user provided comments related to the selected first or second portion of content.

22. The device of claim 20, wherein the web searching type application comprises at least one of a text searching application, an image file searching application, a video file searching application, or an audio file searching application, and wherein the first application or the second application comprises the text searching application and wherein the first or second items of data comprise text search results related to the selected first or second portion of content, or wherein the first or the second application comprises the image file search application and wherein the first or second items of data comprise one or more image files related to the selected first or second portion of content; or wherein the first or the second application comprises the video file searching application and wherein the first or second items of data comprises one or more video files related to the selected first or second portion of content; or wherein the first or the second application comprises the audio file searching application and wherein the first or second items of data comprises one or more audio files related to the selected first or second portion of content.

23. The device of claim 20, wherein the processing unit is further configured to:

cause the first icon to be displayed in a vicinity of the first portion of content when displaying a page of the e-book or e-magazine that includes the first portion of the content; and cause the second icon to be displayed in a vicinity of the second portion of content when displaying a page of the e-book or e-magazine that includes the second portion of the content.

24. A non-transitory computer-readable medium containing instructions executable by at least one processor, the computer-readable medium comprising:

one or more instructions for receiving and displaying an electronic book (e-book) or an electronic magazine (e-magazine);

one or more instructions for receiving user selection of a first portion of content of the e-book or the e-magazine;

one or more instructions for executing a first application that obtains first items of data related to the selected first portion of content, wherein the first application comprises a first type of application;

one or more instructions for receiving selection of one or more of the first items of data;

one or more instructions for attaching the one or more of the first items of data to the selected first portion of the content in a bookmark fashion that creates an annotation associated with the selected first portion of the content to annotate the e-book or the e-magazine;

one or more instructions for receiving user selection of a second portion of content of the e-book or the e-magazine;

one or more instructions for executing a second application that obtains second items of data related to the selected second portion of content, wherein the second application comprises a second type of application that is different than the first type of application;

one or more instructions for receiving selection of one or more of the second items of data;

one or more instructions for attaching the one or more of the second items of data to the selected second portion of the content in a bookmark fashion that creates an annotation associated with the selected second portion of the content to annotate the e-book or e-magazine; and one or more instructions for associating a different icon with each of the first and second portions of the content based on each type of the executed first and second applications.

* * * * *